United States Patent
Faccin et al.

(10) Patent No.: US 9,674,853 B2
(45) Date of Patent: Jun. 6, 2017

(54) TECHNIQUES FOR MANAGING WIRELESS NETWORK CONNECTIONS FOR TRAFFIC AGGREGATION

(71) Applicant: QUALCOMM Incorporated, San Diego, CA (US)

(72) Inventors: Stefano Faccin, Hayward, CA (US); Gavin Bernard Horn, La Jolla, CA (US); Ozcan Ozturk, San Diego, CA (US); Gerardo Giaretta, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/633,897

(22) Filed: Feb. 27, 2015

(65) Prior Publication Data
US 2015/0334724 A1    Nov. 19, 2015

Related U.S. Application Data

(60) Provisional application No. 61/994,510, filed on May 16, 2014.

(51) Int. Cl.
*H04L 12/26* (2006.01)
*H04W 72/10* (2009.01)
(Continued)

(52) U.S. Cl.
CPC ......... *H04W 72/10* (2013.01); *H04W 28/085* (2013.01); *H04W 36/22* (2013.01);
(Continued)

(58) Field of Classification Search
None
See application file for complete search history.

(56) References Cited

U.S. PATENT DOCUMENTS

| 2011/0305220 A1 | 12/2011 | Lindoff et al. |
| 2013/0242783 A1 | 9/2013 | Horn et al. |
| (Continued) | | |

FOREIGN PATENT DOCUMENTS

| EP | 2 723 144 A1 | 4/2014 |
| WO | WO-2012/171587 A1 | 12/2012 |
| (Continued) | | |

OTHER PUBLICATIONS

Partial International Search Report—PCT/US2015/026441—ISA/EPO—Jul. 9, 2015. (8 total pages).
(Continued)

*Primary Examiner* — Edan Orgad
*Assistant Examiner* — Rebecca Song
(74) *Attorney, Agent, or Firm* — Arent Fox LLP

(57) ABSTRACT

Certain aspects of the present disclosure relate to communicating with one or more wireless networks using multiple radio access technologies (RATs). A device can communicate with a first access point using a first RAT over a first connection to access a first wireless network, and communicate with a second access point using a second RAT over a second connection, wherein the second connection is configured to implement traffic aggregation with the first connection based at least in part on a configuration received from the first access point. The device can also manage the second connection based at least in part the implementation of the traffic aggregation with the first connection.

29 Claims, 14 Drawing Sheets

(51) Int. Cl.
*H04W 72/04* (2009.01)
*H04W 76/06* (2009.01)
*H04W 28/08* (2009.01)
*H04W 36/22* (2009.01)
*H04W 48/16* (2009.01)
*H04W 88/06* (2009.01)

(52) U.S. Cl.
CPC ....... *H04W 48/16* (2013.01); *H04W 72/0406* (2013.01); *H04W 76/066* (2013.01); *H04W 88/06* (2013.01)

(56) References Cited

U.S. PATENT DOCUMENTS

| | | | | |
|---|---|---|---|---|
| 2014/0298403 | A1* | 10/2014 | Qureshi | G06F 21/41 726/1 |
| 2015/0029917 | A1* | 1/2015 | Kim | H04W 52/0209 370/311 |
| 2015/0172032 | A1* | 6/2015 | Khay-Ibbat | H04L 5/0057 370/329 |
| 2015/0173009 | A1* | 6/2015 | Vallath | H04W 48/18 370/329 |
| 2015/0208266 | A1* | 7/2015 | Jung | H04L 5/00 370/252 |
| 2015/0289185 | A1* | 10/2015 | Kalapatapu | H04W 36/22 370/230 |

FOREIGN PATENT DOCUMENTS

| | | |
|---|---|---|
| WO | WO-2013/042330 A1 | 3/2013 |
| WO | WO-2013/123643 A1 | 8/2013 |
| WO | WO-2014/008441 A2 | 1/2014 |

OTHER PUBLICATIONS

Intel Corporation: "WLAN Selection Procedure", 3GPP Draft; C1-141212-WAN Selection Procedure, Generation Partnership Project (Mobile Competence Centre ; 650, Lucioles ; F-06921 Sophia-Antipolis; France vol. CT WG1, No. Dubrovnik, Croatia; 20140331-20140404 Mar. 31, 2014 (Mar. 31, 2014), XP050775749, Retrieved from the Internet: URL: http://www.3gpp.org/ftp/MeetingsSYNC/CT/CT1/Docs/ [retrieved on Mar. 31, 2014] paragraph [5.1.3.2.x.2].

International Searech Report and Written Opinion—PCT/US2015/026441—ISA/EPO—Sep. 23, 2015. (37 total pages).

* cited by examiner

TECHNIQUES FOR MANAGING WIRELESS NETWORK CONNECTIONS FOR TRAFFIC AGGREGATION

CLAIM OF PRIORITY UNDER 35 U.S.C. §119

The present application for patent claims priority to Provisional Application No. 61/994,510 entitled "TECHNIQUES FOR MANAGING WIRELESS NETWORK CONNECTIONS FOR TRAFFIC AGGREGATION" filed May 16, 2014, which is assigned to the assignee hereof and hereby expressly incorporated by reference herein.

FIELD OF THE DISCLOSURE

The present disclosure, for example, relates to wireless communication systems, and more particularly to techniques for managing wireless network connections for traffic aggregation.

BACKGROUND OF THE DISCLOSURE

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Additionally, UEs can be equipped to communicate in wireless local area networks (WLAN) by accessing one or more hotspots using a wireless communication technology, such as 802.11 (WiFi). In this regard, a UE can communicate with a radio access network (RAN) of a wireless wide area network (WWAN) (e.g., a cellular network) along with a RAN of one or more WLANs. The UE can include a receiver operable for communicating with the RAN of the WWAN (e.g., a long term evolution (LTE), universal telecommunications mobile system (UMTS), or similar receiver) and another receiver operable for communicating with the RAN of the WLAN (e.g., an 802.11 WiFi receiver). The UE may additionally or alternatively include a single receiver operable for communicating with both RANs. In either case, the UE can communicate with the WWAN and WLAN to provide simultaneous access to one or more network nodes, to offload traffic from the WWAN to WLAN or vice versa, and/or the like.

In another configuration, traffic aggregation can be implemented to allow the UE to communicate with the WWAN over the RAN and also using the WLAN RAN. The UE can communicate with an eNodeB of the WWAN RAN to access the WWAN as well as a WLAN access point of the WLAN RAN, which can communicate with the eNodeB to provide access to the wireless network. This configuration can provide increased throughput for the UE on the WWAN. Upper layers of the UE may be agnostic to this configuration, and thus implementation of traffic aggregation may cause inconsistencies in policies specified for WLAN (e.g., access network discovery and selection function (ANDSF) policies, etc.).

SUMMARY OF THE DISCLOSURE

Aspects of the present disclosure relate generally to wireless communications, and more particularly, to techniques for managing wireless connections for traffic aggregation of one or more networks on one or more other networks that utilize policies for network discovery and selection. For example, techniques for interworking radio access network (RAN) aggregation over wireless local area network (WLAN) connections are described herein.

In accordance with an aspect, a wireless device (e.g., user equipment (UE)) may communicate with access points in multiple RANs using different radio access technologies (RAT) and/or network architectures. For example, the wireless device may communicate with an evolved Node B or other component of a RAN for a wireless wide area network (WWAN) or cellular network, a hotspot or similar access point of a RAN for a WLAN, and/or the like, to access one or more networks. In an example, the UE may implement traffic aggregation (e.g., RAN aggregation) for accessing a first network by using a first RAT over a first connection with a first access point and a second RAT over a second connection with a second access point, where the second access point communicates with the first access point to provide traffic aggregation for the UE to the first network. The first and second access points may be a part of or different RANs. This configuration allows for improved connectivity with the first network, but may introduce ambiguities in network discovery and selection for the second RAT. Thus, techniques to assist in network discovery and selection in such configurations are described herein.

According to an aspect, a method for communicating with one or more wireless networks using multiple RATs is provided. The method includes communicating with a first access point using a first RAT over a first connection to access a first wireless network, communicating with a second access point using a second RAT over a second connection, wherein the second connection is configured to implement traffic aggregation with the first connection based at least in part on a configuration received from the first access point, and managing the second connection based at least in part the implementation of the traffic aggregation with the first connection.

Moreover, for example, the method may include wherein managing the second connection comprises determining whether the second connection configured to implement the traffic aggregation is prioritized over one or more other connections of the second RAT. The method may further include wherein determining whether the second connection configured to implement the traffic aggregation is prioritized over the one or more other connections of the second RAT is based at least in part on one or more policies configured by the first access point or the second access point. Additionally, the method may include, for example, wherein the one or more policies specify that connections of the second RAT configured to implement the traffic aggregation are prioritized over other connections of the second RAT, and further comprising disallowing the one or more other connections where the one or more other connections relate to the second RAT regardless of other policies related to the second RAT. Furthermore, for example, the method may include wherein the one or more policies specify that connections of the second RAT configured to implement the traffic aggregation are prioritized over a subset of rules related to other connections of the second RAT, and further including at least one of disallowing the one or more other connections to which the subset of rules apply where the one or more other connections relate to the second RAT, allowing the one or more other connections to which the subset of rules do not apply where the one or more other connections relate to the second RAT, and disabling the second connection in favor of the one or more other connections. The method may further include determining whether to reconfigure the one or more policies based at least in part on detecting activation or deactivation of one or more connections that utilize traffic aggregation. The method may also include wherein managing the second connection comprises refraining from reporting availability of other networks of the second RAT to a second RAT interface based at least in part on determining that connections of the second RAT configured to use traffic aggregation are prioritized over other connections of the second RAT. Further, the method may include wherein managing the second connection comprises refraining from reporting availability of other networks of the second RAT to a selection function of the second RAT based at least in part on determining that connections of the second RAT configured to use traffic aggregation are prioritized over other connections of the second RAT.

Moreover, the method may also include, for example, wherein managing the second connection comprises determining whether connections of the second RAT configured to implement traffic aggregation are prioritized over one or more other connections that utilize other RATs. The method can additionally include wherein determining whether connections of the second RAT configured to implement traffic aggregation are prioritized over other connections that utilize other RATs is based at least in part on one or more policies configured by the first access point or the second access point. Further, for example, the method may include wherein managing the second connection comprises disallowing the one or more other connections, wherein the one or more other connections are related to other RATs, and wherein determining includes determining that connections of the second RAT configured to use traffic aggregation are prioritized over connections that utilize other RATs.

The method, for example, can also include receiving an indication to initiate the one or more other connections using the second RAT, and wherein managing the second connection comprises disabling the second connection and activating one or more other connections. The method may additionally include wherein receiving the indication comprises receiving the indication from an interface selection or one or more policies of the second RAT. Also, for example, the method may include wherein disabling the second connection comprises sending a message to the first access point to disable the traffic aggregation. The method can further include wherein sending the message to the first access point to disable traffic aggregation comprises sending a cause code in the message related to disabling traffic aggregation due to receiving the indication to initiate the one or more other connections. Further, the method may include sending another indication to the first access point related to termination of the one or more connections based at least in part on terminating the one or more connections, and initiating another connection using the second RAT to access the first wireless network based at least in part on sending the another indication to the first access point.

In an example, the method may also include managing a third connection with a third access point using the second RAT at least in part by utilizing the third connection for specified traffic offload from the first connection or the second connection as specified by one or more policies and not for packet core access to the first wireless network. In this example, the method can include wherein utilizing the third connection for specified traffic offload comprises refraining from notifying of a capability of the third access point to support packet core access to the first wireless network, wherein utilizing the third connection for specified traffic offload comprises refraining from considering a capability of the third access point to support packet core access to the first wireless network in selecting the third access point for the third connection, and/or wherein utilizing the third connection for specified traffic offload comprises refraining from considering a capability of discovered access points to support packet core access to the first wireless network in selecting the third access point for the third connection.

The method may additionally include, for example, wherein managing the second connection is based at least in part on determining a subset of a plurality of bearers for which to utilize traffic aggregation, as well as utilizing the second connection for communications over the subset of the plurality of bearers using the second RAT, and utilizing one or more other connections for communications over a remaining portion of the plurality of bearers using the second RAT. The method can include wherein utilizing the one or more other connections for communications over the remaining portion of the plurality of bearers is based at least in part on one or more policies for the second RAT as well. Furthermore, the method may include wherein utilizing the second connection for communications over the subset of the plurality of bearers using the second RAT comprises indicating that the plurality of bearers are not available for offloading to the one or more other connections, and/or wherein indicating that the plurality of bearers are not available for offloading is in one or more policies specified for the second RAT.

In another aspect, an apparatus for communicating with one or more wireless networks using multiple RATs is provided. The apparatus may include a communicating component configured to communicate with a first access point using a first RAT over a first connection to access a first wireless network, and communicate with a second access point using a second RAT over a second connection, wherein the second connection is configured to implement traffic aggregation with the first connection based at least in part on a configuration received from the first access point, and a connection managing component configured to manage the second connection based at least in part the implementation of the traffic aggregation with the first connection. The apparatus may also include wherein the connection managing component is configured to manage the second connection at least in part by determining whether the second connection configured to implement the traffic aggregation is prioritized over one or more other connections of the second RAT.

In yet another example, an apparatus for communicating with one or more wireless networks using multiple RATs is provided. The apparatus may include means for communicating with a first access point using a first RAT over a first connection to access a first wireless network, means for communicating with a second access point using a second RAT over a second connection, wherein the second connection is configured to implement traffic aggregation with the first connection based at least in part on a configuration received from the first access point, and means for managing the second connection based at least in part the implementation of the traffic aggregation with the first connection. The apparatus may further include wherein the means for managing the second connection is configured to manage the second connection at least in part by determining whether the second connection configured to implement the traffic aggregation is prioritized over one or more other connections of the second RAT.

In still a further example, a computer-readable storage medium for communicating with one or more wireless networks using multiple RATs is provided. The computer-readable storage medium may include code for causing at least one computer to communicate with a first access point using a first RAT over a first connection to access a first wireless network, code for causing the at least one computer to communicate with a second access point using a second RAT over a second connection, wherein the second connection is configured to implement traffic aggregation with the first connection based at least in part on a configuration received from the first access point, and code for causing the at least one computer to manage the second connection based at least in part the implementation of the traffic aggregation with the first connection. The computer-readable storage medium may also include wherein the code for managing the second connection comprises code for managing the second connection at least in part by determining whether the second connection configured to implement the traffic aggregation is prioritized over one or more other connections of the second RAT.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
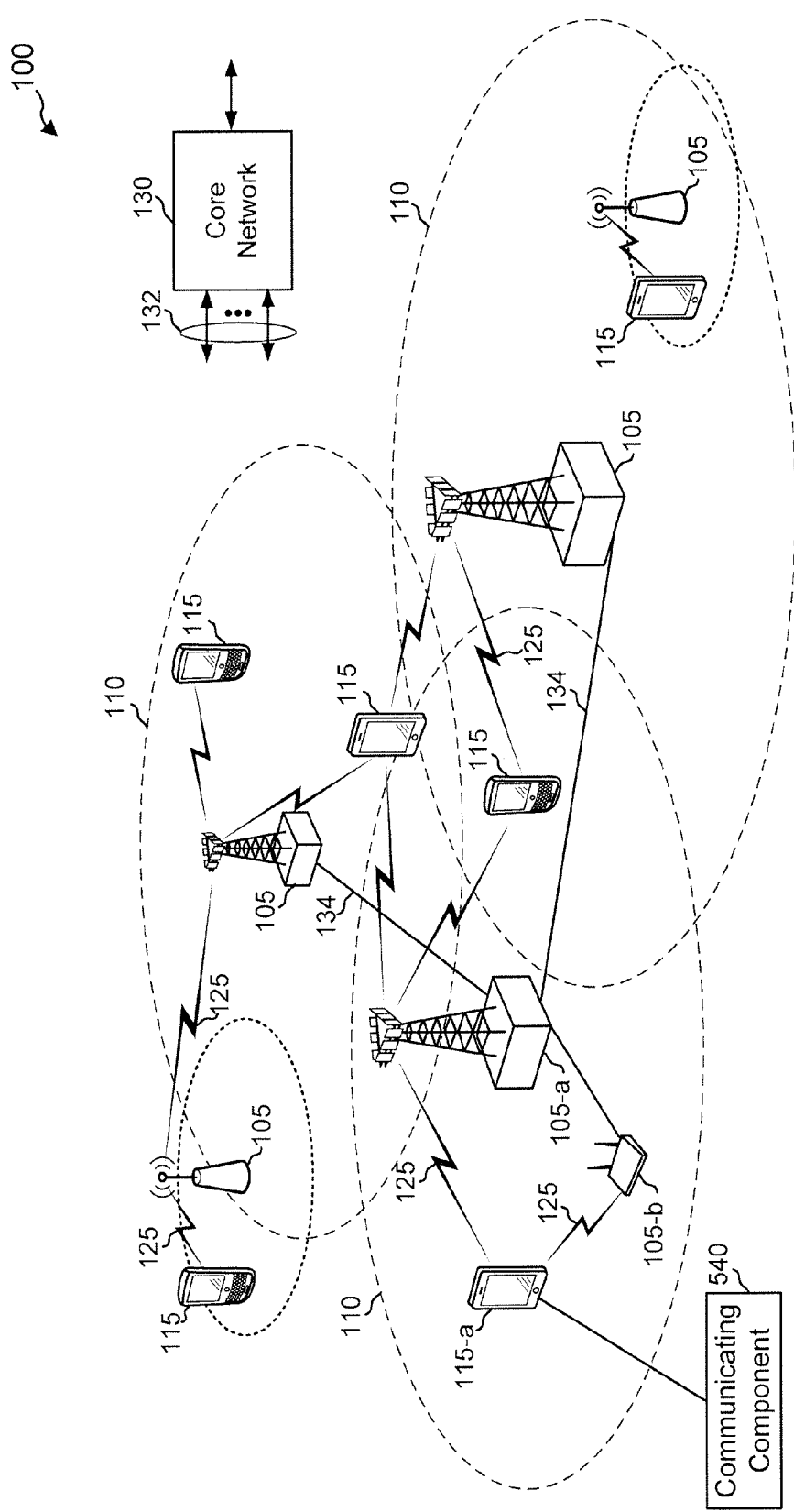
FIG. 1 is a block diagram conceptually illustrating an example of a wireless communications system, in accordance with an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various techniques for managing wireless connections in traffic aggregation may are described. For example, various methods, apparatuses, devices, and systems are described for interworking between traffic aggregation connections and network connections having discovery and selection policies so as to define discovery and selection functions for the network connections in the presence of traffic aggregation connections. For example, a wireless device (e.g., user equipment (UE)) can communicate with a first access point over a first connection using a first RAT to access a first wireless network, and can communicate with a second access point over a second connection using a second RAT. The second access point may be configured to provide traffic aggregation to the first network via the first access point. For example, the second access point, which may be a part of a different radio access network (RAN) than the first access point, can enable communication between the first network and a wireless device along with the first access point. In this regard, the wireless device can connect to the first access point and the second access point, using the first and second RATs respectively, to access the first wireless network. In another example, the wireless device may be configured to access a second wireless network using the second RAT (e.g., a second wireless network related to the second access point or other access points). In this regard, the wireless device can be provisioned with parameters for managing the second connection and/or other connections using the second RAT in the presence of the traffic aggregation provided via the second connection. The above scenarios, and similar scenarios, are referred to herein as RAN aggregation or, more generally, traffic aggregation.

For example, the wireless device can be provisioned with parameters that define a priority for the traffic aggregation connection relative to other connections that use the second RAT. For example, where the second RAT is a WLAN RAT, the wireless device can be provisioned with access network discovery and selection function (ANDSF) policies extended to indicate a priority of traffic aggregation connections that use WLAN RAT relative to other connections that may use WLAN RAT. Moreover, for example, reporting of available connections using the second RAT, interfaces of the second RAT, or RANs that operate using the second RAT can be impacted by whether a traffic aggregation connection using the second RAT is available and/or whether such a connection is active or not. In another example, traffic aggregation connections may be overridden by other connections based on the second RAT that are selected using the wireless device (e.g., explicitly selected at higher layers of the wireless device). Furthermore, for example, traffic steering can be defined for the wireless device where multiple connections using the second RAT are allowed where one of the multiple connections is a traffic aggregation connection. In addition, in an example, the above concepts can be applied per bearer in the wireless device such that each bearer may be established on the first connection using the first RAT, the second connection setup for traffic aggregation using the second RAT, or other second RAT connections.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with an aspect of the present disclosure. The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various embodiments. One or more of the UEs 115 may include a communicating component 540 for performing aspects described herein, including managing first and second connections with one or more base stations 105 where at least one of the first and second connections implements traffic aggregation. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows, examples of which are described further herein.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies. In general, base stations 105-*a* may be base stations corresponding to a WWAN (e.g., LTE or UMTS macro cell, small cell, etc. base stations), and base stations 105-*b* may be base stations corresponding to a WLAN (e.g., WiFi hotspot, also referred to as a WLAN access point). It is to be appreciated, however, that a single base station 105 can support communications over multiple RATs (e.g., LTE and WiFi, LTE and UMTS, UMTS and WiFi, etc.).

As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, a network node may communicate with one or more other network node of wireless and/or core networks.

In implementations, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a small cell, and/or other types of cell. A macro cell generally covers a relatively large geographic area (e.g., several kilometers in radius) and may allow unrestricted access by UEs 115 with service subscriptions with the network provider. A pico cell, for example, would generally cover a relatively smaller geographic area (e.g., buildings) and may allow unrestricted access by UEs 115 with service subscriptions with the network provider. A femto cell, for example, would also generally cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) with two or more eNodeBs 105. The eNodeBs 105 that are used for carrier aggregation may be collocated or may be connected through fast connections. In either case, coordinating the aggregation of component carriers (CCs) for wireless communications between the UE 115 and the eNodeBs 105 may be carried out more easily because information can be readily shared between the various cells being used to perform the carrier aggregation. When the eNodeBs 105 that are used for carrier aggregation are non-collocated (e.g., far apart or do not have a high-speed connection between them), then coordinating the aggregation of component carriers may involve additional aspects.

In addition, for example, some base stations 105 can support traffic aggregation such that base stations using different RATs can communicate to aggregate traffic from both base stations (e.g., for a given UE 115). For example, UE 115-$a$ can communicate with base station 105-$a$ and base station 105-$b$, and base station 105-$b$ can communicate with base station 105-$a$ to aggregate traffic from UE 115-$a$ to the base station 105-$a$ for communicating to a related WWAN. Thus, in one example, UE 115-$a$ may support LTE and WiFi communications using one or more transceivers. In this regard, for example, traffic aggregation can be established for the UE 115-$a$ such that UE 115-$a$ communicates data for a first wireless network to base station 105-$a$ and base station 105-$b$, which operate different RANs, using respective RATs. In one example, base station 105-$b$ can provide the data to base station 105-$a$ for communicating in the related first wireless network. This configuration allows for increased throughput or other improved connectivity properties for the UE 115-$a$. Upper layers of the UE 115-$a$ (and/or a user thereof) may be agnostic to the configuration, however, which may cause inconsistencies between expected and actual network discovery and selection behavior at the UE 115-$a$. Accordingly, aspects described herein relate to defining behaviors for network discovery and selection of networks using one RAT based on implementing connections that aggregate traffic for a network using another RAT.

Figure 2:
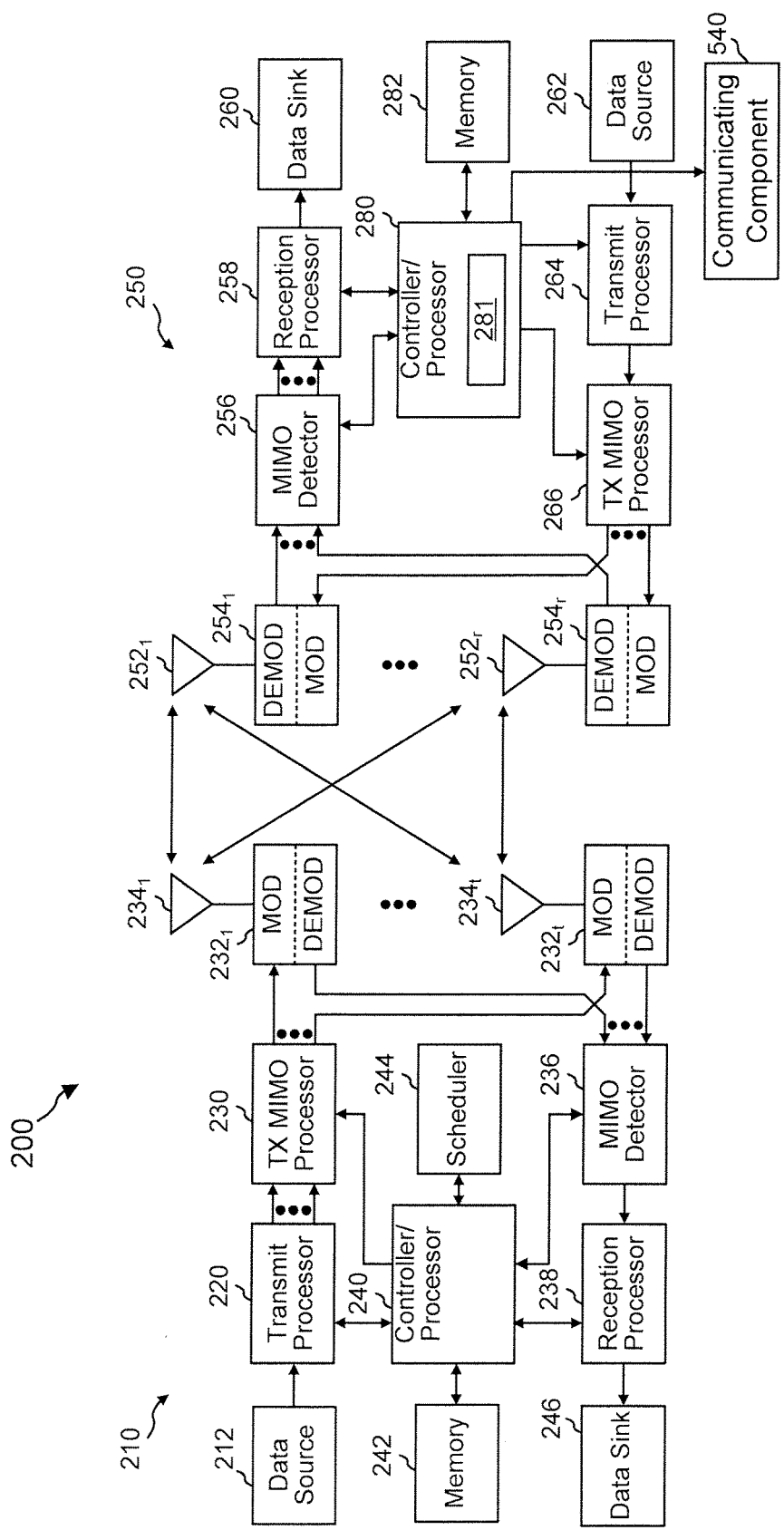
FIG. 2 is a block diagram conceptually illustrating examples of an eNodeB and a UE configured in accordance with an aspect of the present disclosure.

FIG. 2 is a block diagram conceptually illustrating examples of an eNodeB 210 and a UE 250 configured in accordance with an aspect of the present disclosure. For example, the base station/eNodeB 210 and the UE 250 of a system 200, as shown in FIG. 2, may be one of the base stations/eNodeBs and one of the UEs in FIG. 1, respectively. In this regard, UE 250 can include a communicating component 540, coupled to a controller/processor 281 in an example, for performing aspects described herein, including managing first and second connections with one or more eNBs 210 or other base stations/access points where at least one of the first and second connections implements traffic aggregation. Thus, in some aspects, the eNodeB 210 may support traffic aggregation, as described herein. In some aspects, the UE 250 may also support traffic aggregation. The UE 250 may receive configuration information for traffic aggregation from eNodeB 210 or other network entities. The base station 210 may be equipped with antennas $234_{1-t}$, and the UE 250 may be equipped with antennas $252_{1-r}$, wherein t and r are integers greater than or equal to one.

At the base station 210, a base station transmit processor 220 may receive data from a base station data source 212 and control information from a base station controller/ processor 240. The control information may be carried on the PBCH, PCFICH, physical hybrid automatic repeat/request (HARQ) indicator channel (PHICH), PDCCH, etc. The data may be carried on the PDSCH, etc. The base station transmit processor 220 may process (e.g., encode and symbol map) the data and control information to obtain data symbols and control symbols, respectively. The base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to the base station modulators/demodulators (MODs/DEMODs) $232_{1-t}$. Each base station modulator/demodulator 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink signal. Downlink signals from modulators/demodulators $232_{1-t}$ may be transmitted via the antennas $234_{1-t}$, respectively.

At the UE 250, the UE antennas $252_{1-r}$ may receive the downlink signals from the base station 210 and may provide received signals to the UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators $254_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the PUSCH) from a UE data source 262 and control information (e.g., for the PUCCH) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulators $254_{1-r}$ (e.g., for SC-FDM, etc.), and transmitted to the base station 210. At the base station 210, the uplink signals from the UE 250 may be received by the base station antennas 234, processed by the base station modulators/demodulators 232, detected by a base station MIMO detector 236 if applicable, and further processed by a base station reception processor 238 to obtain decoded data and control information sent by the UE 250. The base station reception processor 238 may provide the decoded data to a base station data sink 246 and the decoded control information to the base station controller/processor 240.

The base station controller/processor 240 and the UE controller/processor 280 may direct the operation at the base station 210 and the UE 250, respectively. The UE controller/processor 280 and/or other processors and modules at the UE 250 may also perform or direct, e.g., the execution of the functional blocks illustrated in FIG. 5, and/or other processes for the techniques described herein (e.g., flowcharts illustrated in FIGS. 6-11). In some aspects, at least a portion of the execution of these functional blocks and/or processes may be performed by block 281 in the UE controller/processor 280, which can include a communicating component 540 as described further with reference to FIG. 5. The base station memory 242 and the UE memory 282 may store data and program codes for the base station 210 and the UE 250 (e.g., for performing functions described for communicating component 540), respectively. For example, the UE memory 282 may store configuration information for implementing traffic aggregation or other communication services by the base station 210 and/or another base station. A scheduler 244 may be used to schedule UE 250 for data transmission on the downlink and/or uplink.

In one configuration, the UE 250 may include means for communicating with a first access point using a first RAT over a first connection to access a first wireless network. The UE 250 may also include means for communicating with a second access point using a second RAT over a second connection, wherein the second connection is configured by the first access point to implement traffic aggregation with the first connection. The UE 250 may further include managing the second connection based at least in part the implementation of the traffic aggregation with the first connection. In one aspect, the aforementioned means may be the UE controller/processor 280, the UE memory 282, the UE reception processor 258, the UE MIMO detector 256, the UE modulators/demodulators 254, and the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 5.

Figure 3:
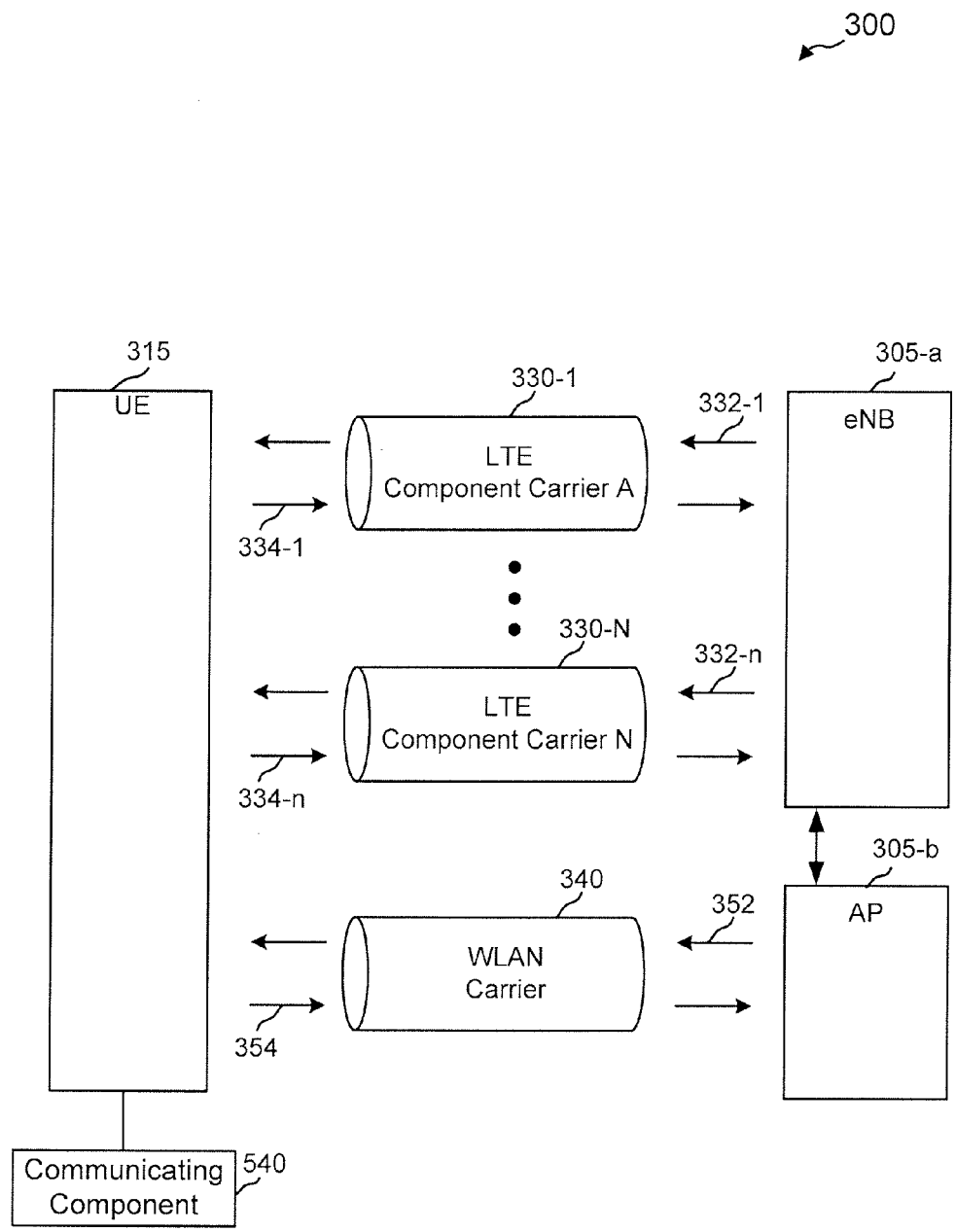
FIG. 3 is a block diagram conceptually illustrating an aggregation of radio access technologies at a UE, in accordance with an aspect of the present disclosure.

FIG. 3 is a block diagram conceptually illustrating an aggregation of radio access technologies at a UE, in accordance with an aspect of the present disclosure. The aggregation may occur in a system 300 including a multi-mode UE 315, which can communicate with an eNodeB 305-a using one or more component carriers 1 through N ($CC_1$-$CC_N$), and/or with a WLAN access point (AP) 305-b using WLAN carrier 340. Thus, in an example, UE 315 can include a communicating component 540 for performing aspects described herein, including managing first and second connections with one or more eNBs 305-a, WLAN AP 305-b or other base stations/access points over one or more CCs 330 or 340 where at least one of the first and second connections implements traffic aggregation. A multi-mode UE in this example may refer to a UE that supports more than one radio access technology (RAT). For example, the UE 315 supports at least a WWAN radio access technology (e.g., LTE) and a WLAN radio access technology (e.g., Wi-Fi). A multi-mode UE may also support carrier aggregation using one or more of the RATs. The UE 315 may be an example of one of the UEs of FIG. 1, FIG. 2, FIG. 3, FIG. 4a, FIG. 4b, FIG. 4c, or FIG. 5. The eNodeB 305-a may be an example of one of the eNodeBs or base stations of FIG. 1, FIG. 2, FIG. 3, FIG. 4a, FIG. 4b, FIG. 4c, or FIG. 5. While only one UE 315, one eNodeB 305-a, and one AP 305-b are illustrated in FIG. 3, it will be appreciated that the system 300 can include any number of UEs 315, eNodeBs 305-a, and/or APs 305-b. In one specific example, UE 315 can communicate with one eNB 305 over one LTE component carrier 330 while communicating with another eNB 305 over another component carrier 330.

The eNodeB 305-a can transmit information to the UE 315 over forward (downlink) channels 332-1 through 332-N on LTE component carriers $CC_1$ through $CC_N$ 330. In addition, the UE 315 can transmit information to the eNodeB 305-*a* over reverse (uplink) channels 334-1 through 334-N on LTE component carriers $CC_1$ through $CC_N$. Similarly, the AP 305-*b* may transmit information to the UE 315 over forward (downlink) channel 352 on WLAN carrier 340. In addition, the UE 315 may transmit information to the AP 305-*b* over reverse (uplink) channel 354 of WLAN carrier 340.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

In multi-carrier operations, the downlink control information (DCI) messages associated with different UEs 315 can be carried on multiple component carriers. For example, the DCI on a PDCCH can be included on the same component carrier that is configured to be used by a UE 315 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

In the present example, the UE 315 may receive data from one eNodeB 305-*a*. However, users on a cell edge may experience high inter-cell interference which may limit the data rates. Multiflow allows UEs to receive data from two eNodeBs 305-*a* simultaneously. In some aspects, the two eNodeBs 305-*a* may be non-collocated and may be configured to support carrier aggregation. Multiflow works by sending and receiving data from the two eNodeBs 305-*a* in two totally separate streams when a UE is in range of two cell towers in two adjacent cells at the same time. The UE talks to two eNodeBs 305-*a* simultaneously when the device is on the edge of either eNodeBs' reach. By scheduling two independent data streams to the mobile device from two different eNodeBs at the same time, multiflow exploits uneven loading in HSPA networks. This helps improve the cell edge user experience while increasing network capacity. In one example, throughput data speeds for users at a cell edge may double. In some aspects, multiflow may also refer to the ability of a UE to talk to a WWAN tower (e.g., cellular tower) and a WLAN tower (e.g., AP) simultaneously when the UE is within the reach of both towers. In such cases, the towers may be configured to support carrier aggregation through multiple connections when the towers are not collocated. Multiflow is a feature of LTE/LTE-A that is similar to dual-carrier HSPA, however, there are differences. For example, dual-carrier HSPA doesn't allow for connectivity to multiple towers to connect simultaneously to a device.

In LTE-A standardization, LTE component carriers 330 have been backward-compatible, which enabled a smooth transition to new releases. However, this feature caused the LTE component carriers 330 to continuously transmit common reference signals (CRS, also referred to as cell-specific reference signals) in every subframe across the bandwidth. Most cell site energy consumption is caused by the power amplifier, as the cell remains on even when only limited control signaling is being transmitted, causing the amplifier to continue to consume energy. CRS were introduced in release 8 of LTE and are LTE's most basic downlink reference signal. The CRSs are transmitted in every resource block in the frequency domain and in every downlink subframe. CRS in a cell can be for one, two, or four corresponding antenna ports. CRS may be used by remote terminals to estimate channels for coherent demodulation. A New Carrier Type (NCT) allows temporarily switching off of cells by removing transmission of CRS in four out of five sub frames. This feature reduces power consumed by the power amplifier, as well as the overhead and interference from CRS, as the CRS is no longer continuously transmitted in every subframe across the bandwidth. In addition, the New Carrier Type allows the downlink control channels to be operated using UE-specific Demodulation Reference Symbols. The New Carrier Type might be operated as a kind of extension carrier along with another LTE/LTE-A carrier or alternatively as standalone non-backward compatible carrier.

eNB 305-*a* can configure UE 315 to utilize component carrier 330-1 (and/or component carriers 330-1 to 330-N) as well as WLAN carrier 340 to communicate data to a network corresponding to eNB 305-*a*. In this regard, traffic aggregation is provided by AP 305-*b* communicating traffic received over WLAN carrier 340 to eNB 305-*a* and communicating traffic from eNB 305-*a* over WLAN carrier 340 to UE 315. Thus, eNB 305-*a* can utilize the various carriers (at least component carrier 330-1 and WLAN carrier 340) to facilitate communication between UE 315 and a corresponding network. UE 315 may also be configured to access another network related to AP 305-*b* or another WLAN AP. Because the described configuration may be agnostic to higher layers and/or a user of the UE 315, this may result in inconsistencies between expected and actual network discovery and selection for WLAN at the UE 315. Aspects described herein define operation of UE 315 where WLAN carrier 340 supports traffic aggregation from UE 315 to eNB 305-*a*.

Figure 4A:
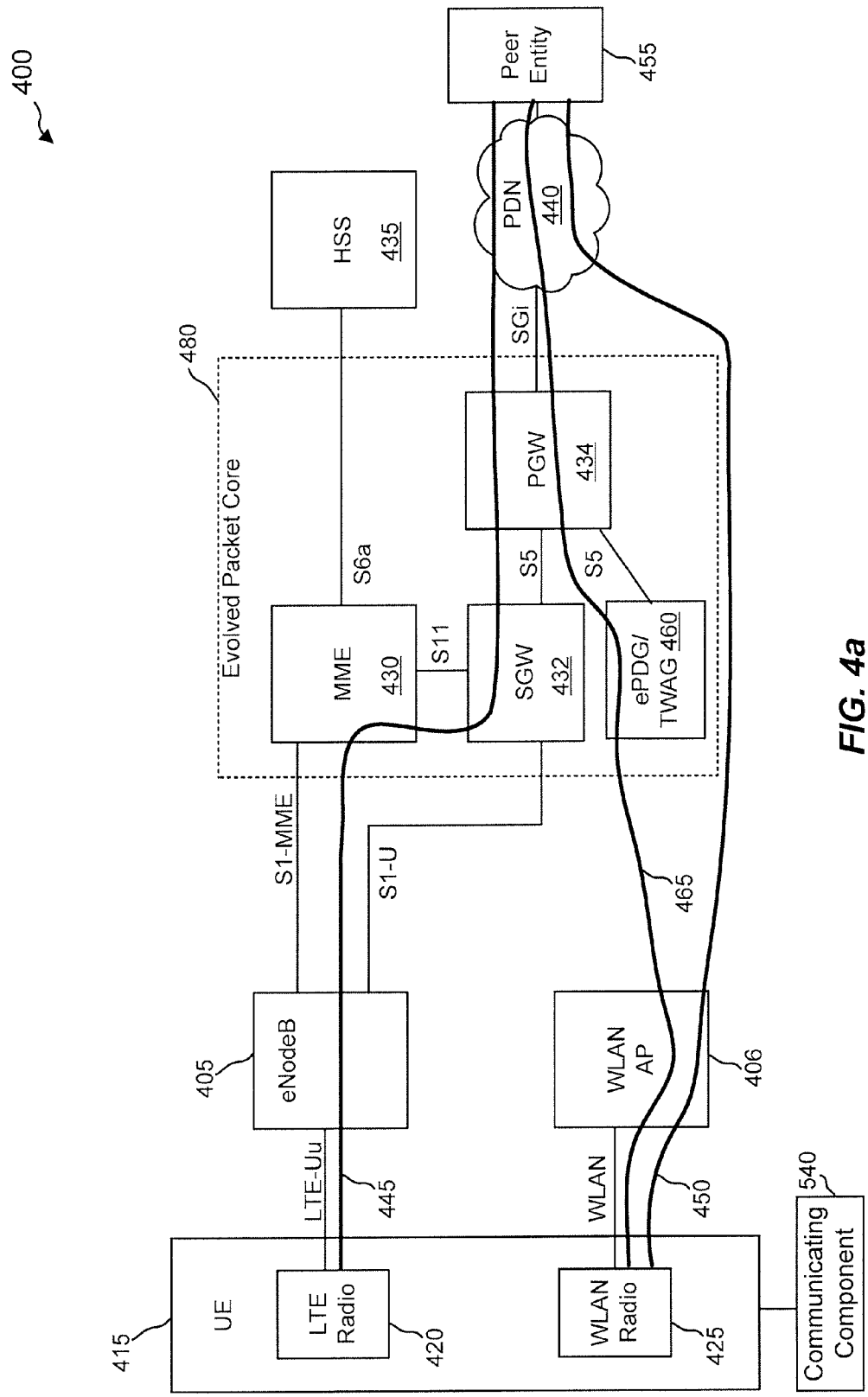
FIGS. 4a, 4b, and 4c are block diagrams conceptually illustrating an example of data paths between a UE and a PDN in accordance with an aspect of the present disclosure.

FIG. 4*a* is a block diagram conceptually illustrating an example of data paths 445 and 450 between a UE 415 and a packet data network (PDN) 440 (e.g., Internet or one or more components to access the Internet) in accordance with an aspect of the present disclosure. The data paths 445, 450, and 465 are shown within the context of a wireless communications system 400 for aggregating data from different radio access technologies. The data path 450 corresponds to the UE 415 getting IP connectivity directly from the WLAN AP 406, without any traffic traversing the Evolved Packet Core 480. Data path 450 is also referred to as Non-Seamless WLAN Offloading (NSWO). UE 415 can include a communicating component 540 for performing aspects described herein, including managing first and second connections (e.g., over one or more data paths 445, 450, 465) with one or more eNBs 405, WLAN AP 406s, or other base stations/access points where at least one of the first and second connections implements traffic aggregation. The system 200 of FIG. 2 may be an example of portions of the wireless communications system 400. The wireless communications system 400 may include a multi-mode UE 415, an eNodeB 405, a WLAN AP 406, an evolved packet core (EPC) 480, a PDN 440, and a peer entity 455. The multi-mode UE 415 may be configured to support carrier aggregation and/or traffic aggregation, as described herein. The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and a WLAN radio 425. These elements may represent aspects of one or more of their counterparts described above with reference to the previous or subsequent Figures. For example, the UE 415 may be an example of UEs in FIG. 1, FIG. 2, FIG. 3, FIG. 4b, FIG. 4c, or FIG. 5, the eNodeB 405 may be an example of the eNodeBs/base stations of FIG. 1, FIG. 2, FIG. 3, FIG. 5, FIG. 4b, FIG. 4c, or FIG. 5, the AP 406 may be an example of the AP of FIG. 1, FIG. 3, FIG. 4b, FIG. 4c, or FIG. 5, etc., and/or the EPC 480 may be an example of the core network of FIG. 1 and/or FIG. 7. The eNodeB 405 and AP 406 in FIG. 4a may be not be collocated or otherwise may not be in high-speed communication with each other.

Referring back to FIG. 4a, the eNodeB 405 and the AP 406 may be capable of providing the UE 415 with access to the PDN 440 using the aggregation of one or more LTE component carriers or one or more WLAN component carriers. Accordingly, the UE 415 may involve carrier aggregation in dual connectivity, where one connection is to one network entity (eNodeB 405) and the other connection is to a different network entity (AP 406 or another eNodeB, not shown). Using this access to the PDN 440, the UE 415 may communicate with the peer entity 455 or other network entities. The eNodeB 405 may provide access to the PDN 440 through the evolved packet core 480 (e.g., through data path 445), and the WLAN AP 406 may provide at least one of direct access to the PDN 440 (e.g., through data path 450), which can be used for non-seamless WLAN offload (NSWO) of traffic from the eNodeB 405 to the WLAN AP 406, or access to the PDN 440 via evolved packet data gateway (ePDG)/trusted wireless access gateway (TWAG) 460 of the EPC 480 (e.g., through data path 465), which can be referred to as EPC connectivity provided by the WLAN AP 406 when referring to the WLAN AP 406. For example, access via a TWAG portion of the TWAG/ePDG 460 can be over an S2a interface and can include utilizing an S5 interface to communicate with PGW 434 using proxy mobile internet protocol (PMIP), general packet radio service (GPRS) tunneling protocol (GTP), etc. In addition, for example, access via an ePDG portion of the TWAG/ePDG 460 can be over an S2b interface and can include establishing an internet protocol security (IPSec) connection between the UE 415 and ePDG portion, which can communicate with PGW 434 using PMIP or GTP over the S5 interface.

The MME 430 may be the control node that processes the signaling between the UE 415 and the EPC 480. Generally, the MME 430 may provide bearer and connection management. The MME 430 may, therefore, be responsible for idle mode UE tracking and paging, bearer activation and deactivation, and SGW selection for the UE 415. The MME 430 may communicate with the eNodeB 405 over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMEs 430. The HSS 435 may communicate with the MME 430 over an S6a interface defined by the Evolved Packet System (EPS) architecture standardized by the 3GPP organization.

User IP packets transmitted over LTE may be transferred through eNodeB 405 to the SGW 432, which may be connected to the PDN gateway 434 over an S5 signaling interface and the MME 430 over an S11 signaling interface. The SGW 432 may reside in the user plane and act as a mobility anchor for inter-eNodeB handovers and handovers between different radio access technologies. The PDN gateway 434 may provide UE IP address allocation as well as other functions.

The PDN gateway 434 may provide connectivity to one or more external packet data networks, such as PDN 440, over an SGi signaling interface. The PDN 440 may include the Internet, an Intranet, an IP Multimedia Subsystem (IMS), a Packet-Switched (PS) Streaming Service (PSS), and/or other types of PDNs.

In the present example, user plane data between the UE 415 and the EPC 480 may traverse the same set of one or more EPS bearers, irrespective of whether the traffic flows over data path 445 of the LTE link or data path 450 or 465 of the WLAN link. Signaling or control plane data related to the set of one or more EPS bearers may be transmitted between the LTE radio 420 of the UE 415 and the MME 430 of the EPC 480, by way of the eNodeB 405.

While aspects of FIG. 4a have been described with respect to LTE, similar aspects regarding aggregation and/or multiple connections may also be implemented with respect to UMTS or other similar system or network wireless communications radio technologies.

Figure 4B:
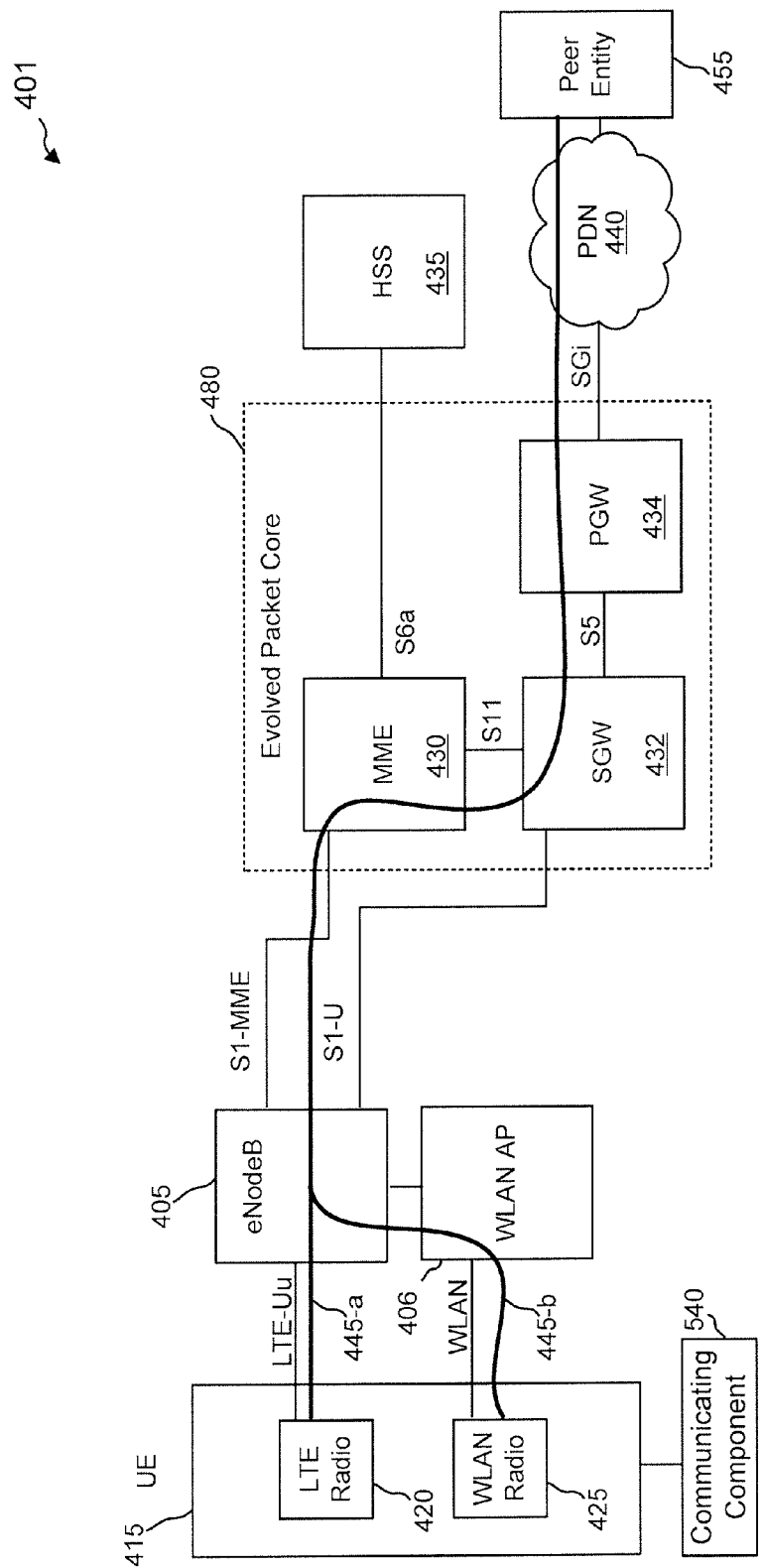

FIG. 4b is a block diagram conceptually illustrating an example of data paths 445-a and 445-b between the UE 415 and the EPC 480 in accordance with an aspect of the present disclosure. The data paths 445-a, 445-b are shown within the context of a wireless communications system 401 for aggregating traffic for transmitting using resources of eNodeBs 405 and WLAN AP 406. This can be an alternative bearer configuration to that shown in FIG. 4a, for example, having data path 445 that traverses eNodeB 405 and data paths 450 and 465 that traverse a WLAN AP 406. UE 415 can include a communicating component 540 for performing aspects described herein, including managing first and second connections (e.g., over one or more data paths 445-a, 445-b) with one or more eNBs 405, WLAN AP 406s, or other base stations/access points where at least one of the first and second connections implements traffic aggregation. The system 200 of FIG. 2 may be an example of portions of the wireless communications system 401. The wireless communications system 401 may include a UE 415, eNodeB 405, WLAN AP 406, an evolved packet core (EPC) 480, a PDN 440, and a peer entity 455. The UE 415 may be configured to support traffic aggregation, as described herein, though the traffic aggregation can be controlled by eNodeB 405 and may be agnostic to upper layers of the UE 415. It is to be appreciated that the UE 415 can be a multi-mode UE that can also communicate with eNodeBs 405-a, and 405-b of FIG. 4a, in addition to a WLAN AP 406, however, such components may be omitted for ease of explanation.

The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and a WLAN radio 425. It is to be appreciated that the UE 415 can include one or more such radios and/or the radios may be integrated. Thus, in an example, LTE radio 420 can also include a WLAN radio (or can be configured to process WLAN signals) in addition to the WLAN radio 425, and in this example, UE 415 includes two WLAN interfaces—one in the LTE radio 420 and one in the WLAN radio 425. These elements may represent aspects of one or more of their counterparts described above with reference to the previous or subsequent Figures. For example, the UE 415 may be an example of UEs in FIG. 1, FIG. 2, FIG. 3, FIG. 4a, FIG. 4c, or FIG. 5, the eNodeB 405-a may be an example of the eNodeBs/base stations of FIG. 1, FIG. 2, FIG. 3, FIG. 4a, FIG. 4c, or FIG. 5, WLAN AP 406 may be an example of the APs described in FIG. 1, FIG. 3, FIG. 4a, FIG. 4c, or FIG. 5, and/or the EPC 480 may be an example of the core network of FIG. 1 and/or FIG. 12.

Referring back to FIG. 4b, the eNodeB 405-a may be capable of providing the UE 415 with access to the PDN 440, which may relate to one or more LTE component carriers, as described. WLAN AP 406 may be capable of providing the UE 415 with access to the PDN 440 by traversing the eNodeB 405. Thus, eNodeB 405 and WLAN AP 406 can communicate to aggregate traffic from UE 415. Accordingly, the UE 415 may involve traffic aggregation where one connection is to a first access point (eNodeB 405) and the other connection is to a second access point (WLAN AP 406), where the second access point communicates with the first access point to aggregate traffic for the UE 415. Using this configuration, bearers can be established for the UE 415 with EPC 480 and can be established via the eNodeB 405 and/or the WLAN AP 406.

In one example, bearer selection can be configured where the UE 415 has separate bearers established between the EPC 408 and the eNodeB 405 and between the EPC 480 and the WLAN AP 406 (via eNodeB 405). In this example, data traffic (e.g., IP packets) is sent over respective bearers, which can map to carriers between the UE 415 and eNodeB 405/WLAN AP 406. The respective bearers, in this regard, may be associated with a traffic flow template (TFT) defining parameters for communicating traffic over the given carrier. Additionally, in this example, the bearers may have separate packet data convergence protocol (PDCP) and/or radio link control (RLC) layers such that reordering of packets between the eNodeB 405 and WLAN AP 406 is not needed.

In another example, radio link control (RLC)/packet data convergence protocol (PDCP) level traffic aggregation can be configured where the UE 415 bearers are between the eNodeB 405 and EPC 480 even for the WLAN AP 406 carriers. In this example, data traffic (e.g., IP packets) is aggregated at the RLC/PDCP level and communicated to UE 415 or respective carriers with the eNodeB 405 and WLAN AP 406. In this example, the eNodeB 405 may reorder packets such to separate packets at eNodeB 405 from packets received from or for communicating to WLAN AP 406 over the respective data path 445-b to UE 415.

While aspects of FIG. 4b have been described with respect to LTE, similar aspects regarding aggregation and/or multiple connections may also be implemented with respect to UMTS or other similar system or network wireless communications radio technologies.

Figure 4C:
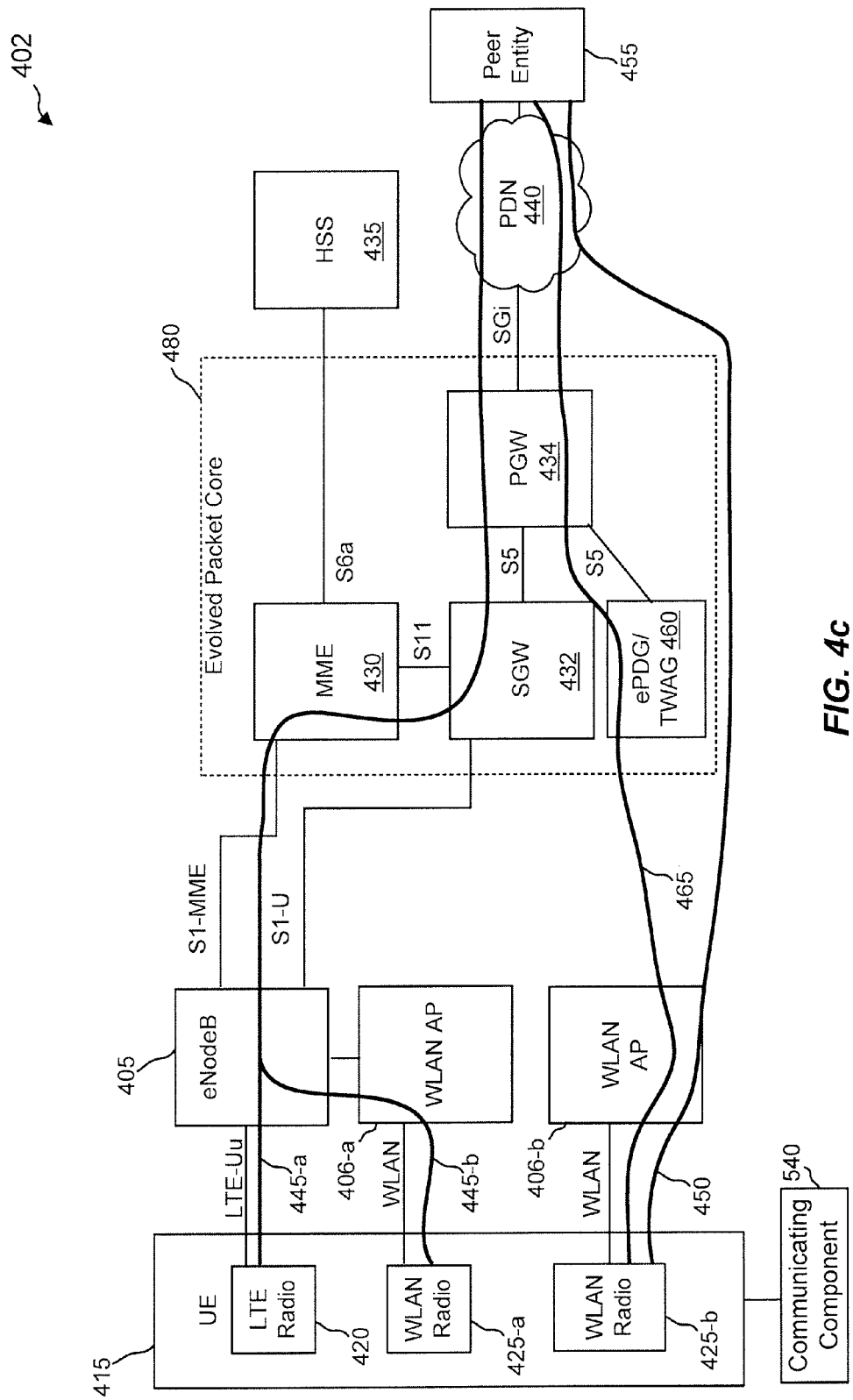

FIG. 4c is a block diagram conceptually illustrating an example of data paths 445, 450, and 465 between a UE 415 and a packet data network (PDN) 440 (e.g., Internet or one or more components to access the Internet) in accordance with an aspect of the present disclosure. The data paths 445-a, 445-b, 450, 465 are shown within the context of a wireless communications system 402 for aggregating data from different radio access technologies. UE 415 can include a communicating component 540 for performing aspects described herein, including managing multiple connections (e.g., over one or more data paths 445-a, 445-b, 450, 460) with one or more eNBs 405, WLAN AP 406s, or other base stations/access points where at least a portion of the multiple connections implement traffic aggregation. The system 200 of FIG. 2 may be an example of portions of the wireless communications system 402. The wireless communications system 400 may include a multi-mode UE 415, an eNodeB 405, a WLAN AP 406-a, a WLAN AP 406-b, an evolved packet core (EPC) 480, a PDN 440, and a peer entity 455. The multi-mode UE 415 may be configured to support carrier aggregation and/or traffic aggregation, as described herein.

The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and two WLAN radios 425-a and 425-b. These elements may represent aspects of one or more of their counterparts described above with reference to the previous or subsequent Figures. For example, the UE 415 may be an example of UEs in FIG. 1, FIG. 2, FIG. 3, FIG. 4b, or FIG. 5, the eNodeB 405 may be an example of the eNodeBs/base stations of FIG. 1, FIG. 2, FIG. 3, FIG. 4a, FIG. 4b, or FIG. 5, the APs 406-a, 406-b may be an example of the AP of FIG. 1, FIG. 3, FIG. 4a, FIG. 4b, or FIG. 5, etc., and/or the EPC 480 may be an example of the core network of FIG. 1 and/or FIG. 12. The eNodeB 405 and APs 406-a, 406-b in FIG. 4c may or may not be collocated or otherwise may or may not be in high-speed communication with each other.

Referring back to FIG. 4c, the eNodeB 405 and the APs 406-a, 406-b may be capable of providing the UE 415 with access to the PDN 440 using the aggregation of one or more LTE component carriers or one or more WLAN component carriers. Accordingly, the UE 415 may involve carrier aggregation in multiple connectivity, where one connection is to one network entity (eNodeB 405), one connection is to another network entity (AP 406-a) for traffic aggregation via eNodeB 405, and yet another other connection is to a different network entity (AP 406-b) for an alternate connection providing EPC connectivity, NSWO, etc., as described herein. Using this access to the PDN 440, the UE 415 may communicate with the peer entity 455. The eNodeB 405 may provide access to the PDN 440 through the evolved packet core 480 (e.g., through data path 445-a and/or 445-b). The WLAN AP 406-a may provide a traffic aggregation connection for the UE 415 to access EPC 480 additionally via eNodeB 405 using one or more WLAN bearers. The WLAN AP 406-b may provide at least one of direct access to the PDN 440 (e.g., through data path 450)—e.g., to provide NSWO of traffic from one or more of the data paths 445-a or 445-b—or access to the PDN 440 via evolved packet data gateway (ePDG)/trusted wireless access gateway (TWAG) 460 of the EPC 480 (e.g., through data path 465)—e.g., to provide EPC connectivity for the UE 415.

The MME 430 may be the control node that processes the signaling between the UE 415 and the EPC 480. Generally, the MME 430 may provide bearer and connection management, as described. The MME 430 may, therefore, be responsible for idle mode UE tracking and paging, bearer activation and deactivation, and SGW selection for the UE 415. The MME 430 may communicate with the eNodeB 405 over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMEs 430. The HSS 435 may communicate with the MME 430 over an S6a interface defined by the Evolved Packet System (EPS) architecture standardized by the 3GPP organization.

User IP packets transmitted over LTE may be transferred through eNodeB 405 to the SGW 432, which may be connected to the PDN gateway 434 over an S5 signaling interface and the MME 430 over an S11 signaling interface. The SGW 432 may reside in the user plane and act as a mobility anchor for inter-eNodeB handovers and handovers between different radio access technologies. The PDN gateway 434 may provide UE IP address allocation as well as other functions.

The PDN gateway 434 may provide connectivity to one or more external packet data networks, such as PDN 440, over an SGi signaling interface. The PDN 440 may include the Internet, an Intranet, an IP Multimedia Subsystem (IMS), a Packet-Switched (PS) Streaming Service (PSS), and/or other types of PDNs.

In the present example, user plane data between the UE 415 and the EPC 480 may traverse the same set of one or more EPS bearers, irrespective of whether the traffic flows over path data 445-a of the LTE link, 445-b of the traffic aggregation link, or data path 450 or 465 of the WLAN link. Signaling or control plane data related to the set of one or more EPS bearers may be transmitted between the LTE radio 420 of the UE 415 and the MME 430 of the EPC 480, by way of the eNodeB 405, WLAN radio 425-a of the UE 415 and the MME 430 of the EPC, by way of the WLAN AP 406-a and eNodeB 405, etc.

While aspects of FIG. 4c have been described with respect to LTE, similar aspects regarding aggregation and/or multiple connections may also be implemented with respect to UMTS or other similar system or network wireless communications radio technologies.

Figure 5:
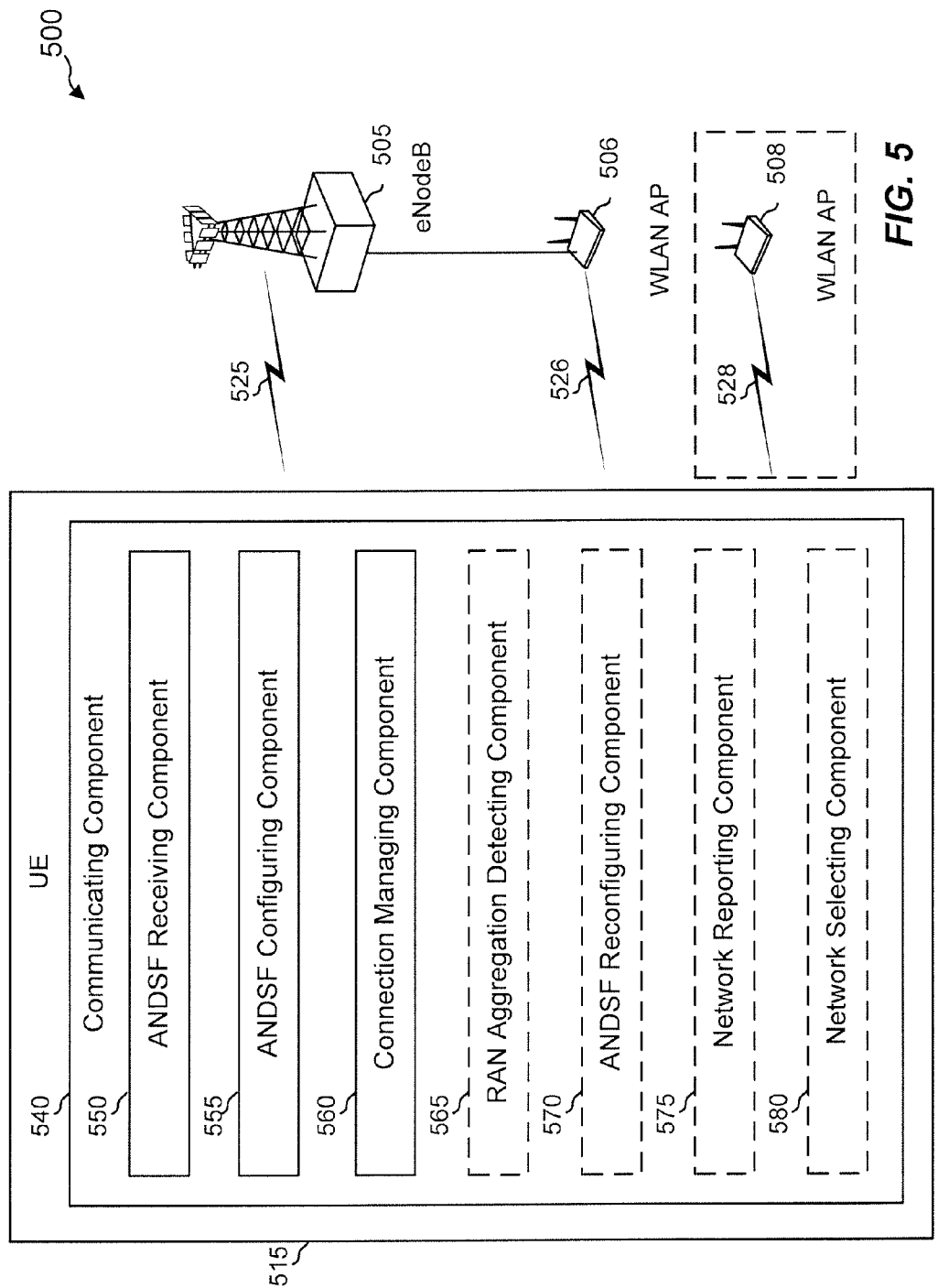
FIG. 5 is a block diagram conceptually illustrating an example of a UE and components configured in accordance with an aspect of the present disclosure.

FIG. 5 is a block diagram 500 conceptually illustrating an example of a UE 515 and components configured in accordance with an aspect of the present disclosure. FIGS. 6-11, which are described in conjunction with FIG. 5 herein, illustrate example methods (600, 700, 800, 900, 1000, and 1100) in accordance with aspects of the present disclosure. Although the operations described below in FIGS. 6-11 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 5, a base station/eNodeB 505, a WLAN AP 506, and the UE 515 of block diagram 500 may be one of the base stations/eNodeBs, APs, and/or UEs as described in various Figures. The eNodeB 505 and the UE 515 may communicate over communication link 525. The WLAN AP 506 and the UE 515 may communicate over communication link 526. Each of the communication links 525, 526 may be an example of the communication links 125 of FIG. 1. In addition, for example, eNodeB 505 can communicate with WLAN AP 506 to configure and provide traffic aggregation (also may be referred to as RAN aggregation) for the UE 515, as described above, such that traffic can be communicated between UE 515 and a network related to eNodeB 505 by using radio access via the eNodeB 505 and WLAN AP 506 (which may receive/provide traffic from/to the eNodeB 505 for communicating in the network).

UE 515 can be provisioned to implement traffic aggregation by the eNodeB 505. For example, UE 515 can include a communicating component 540 for receiving a traffic aggregation configuration specifying to communicate with both eNodeB 505 using a related radio (e.g., LTE/UMTS radio) and with WLAN AP 506 using a related radio (e.g., WiFi radio) to access a WWAN or cellular network. As described, traffic aggregation can be configured and implemented in lower layers of the UE 515 (e.g., physical (PHY)/media access control (MAC) layer or RLC/PDCP layer), such that a high level operating system (HLOS), applications operating on the HLOS, a user interface, etc. may be agnostic to the presence of traffic aggregation. Thus, for example, a HLOS, application, user interface, etc. may expect to be able to connect to a WLAN network using a WLAN receiver of the UE 515 without knowing that the UE 515 is using a WLAN connection for traffic aggregation. Thus, for example, various behaviors for the UE 515 can be defined in such cases, examples of which are described below with further reference to FIGS. 6-11.

Figure 6:
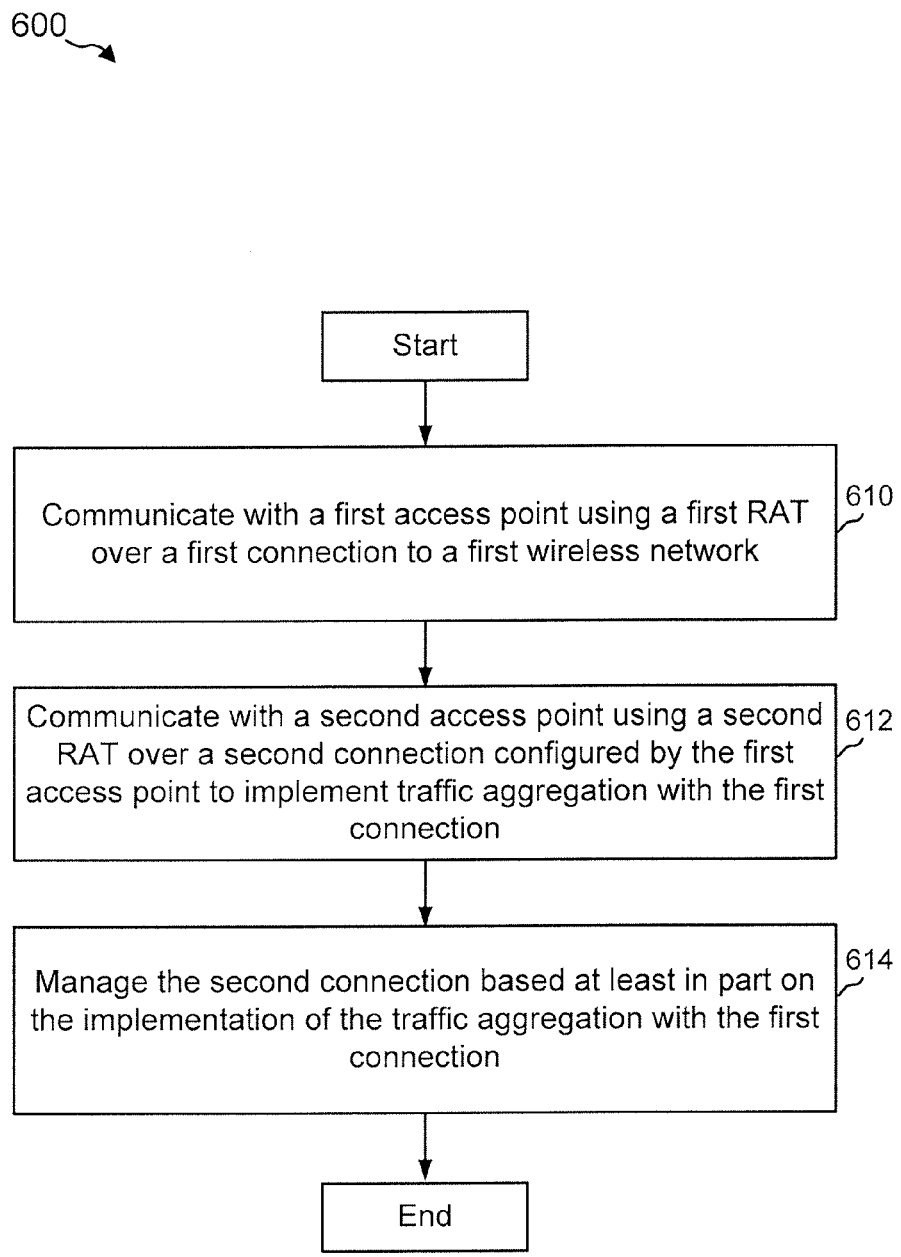
FIG. 6 is a flowchart illustrating a method for managing multiple connections in accordance with an aspect of the present disclosure.

Referring to FIG. 6, method 600 includes, at Block 610, communicating with a first access point using a first RAT over a first connection to a first wireless network. UE 515 includes a communicating component 540 for communicating with the first access point (e.g., eNodeB 505) using the first RAT (e.g., LTE, UMTS, etc.) over the first connection (e.g., communication link 525) to first network. Method 600 also includes, at Block 612, communicating with a second access point using a second RAT over a second connection configured by the first access point to implement traffic aggregation with the first connection. Thus, communicating component 540 can also communicate with the second access point (e.g., WLAN AP 506) using the second RAT (e.g., 802.11 WiFi) over the second connection (e.g., communication link 526) where the second connection is configured to implement traffic aggregation with the first connection (e.g., communication link 525) based at least in part on a configuration received from the first access point (e.g., eNodeB 505). For example, eNodeB 505 can configure traffic aggregation for UE 515 such that UE 515 communicates with both eNodeB 505 and WLAN AP 506 to access a network related to the eNodeB 505. In this regard, as described, WLAN AP 506 can communicate UE 515 traffic with the eNodeB 505 to provide the traffic aggregation for the UE 515 with the communication link 525 via the additional communication link 526. It is to be appreciated that additional communication links between the UE 515 and one or more eNodeBs, WLAN APs, etc., are possible and can be provided for further aggregation of traffic (though not shown for ease of explanation).

As described, providing traffic aggregation in this regard can improve connectivity of the UE 515 with the network related to eNodeB 505, but can also result in inconsistencies in WLAN network discovery and selection where a WLAN interface of the UE 515 is being used to communicate with WLAN AP 506 for traffic aggregation. The inconsistencies may arise in cases where the WLAN interface of the UE 515 is the only WLAN interface of the UE 515 or is one of multiple WLAN interfaces in the UE 515. Accordingly, method 600 includes, at Block 614, managing the second connection based at least in part on the implementation of the traffic aggregation with the first connection. Communicating component 540 can include a connection managing component 560 for managing the second connection (e.g., communication link 526) and/or other connections of the second RAT (e.g. communication link 528, as described further herein) based at least in part on the implementation of traffic aggregation with the first connection (e.g., communication link 525). For example, various mechanisms can be used to manage the second connection and/or other connections that use the second RAT (e.g., WLAN) when traffic aggregation is implemented.

Figure 7:
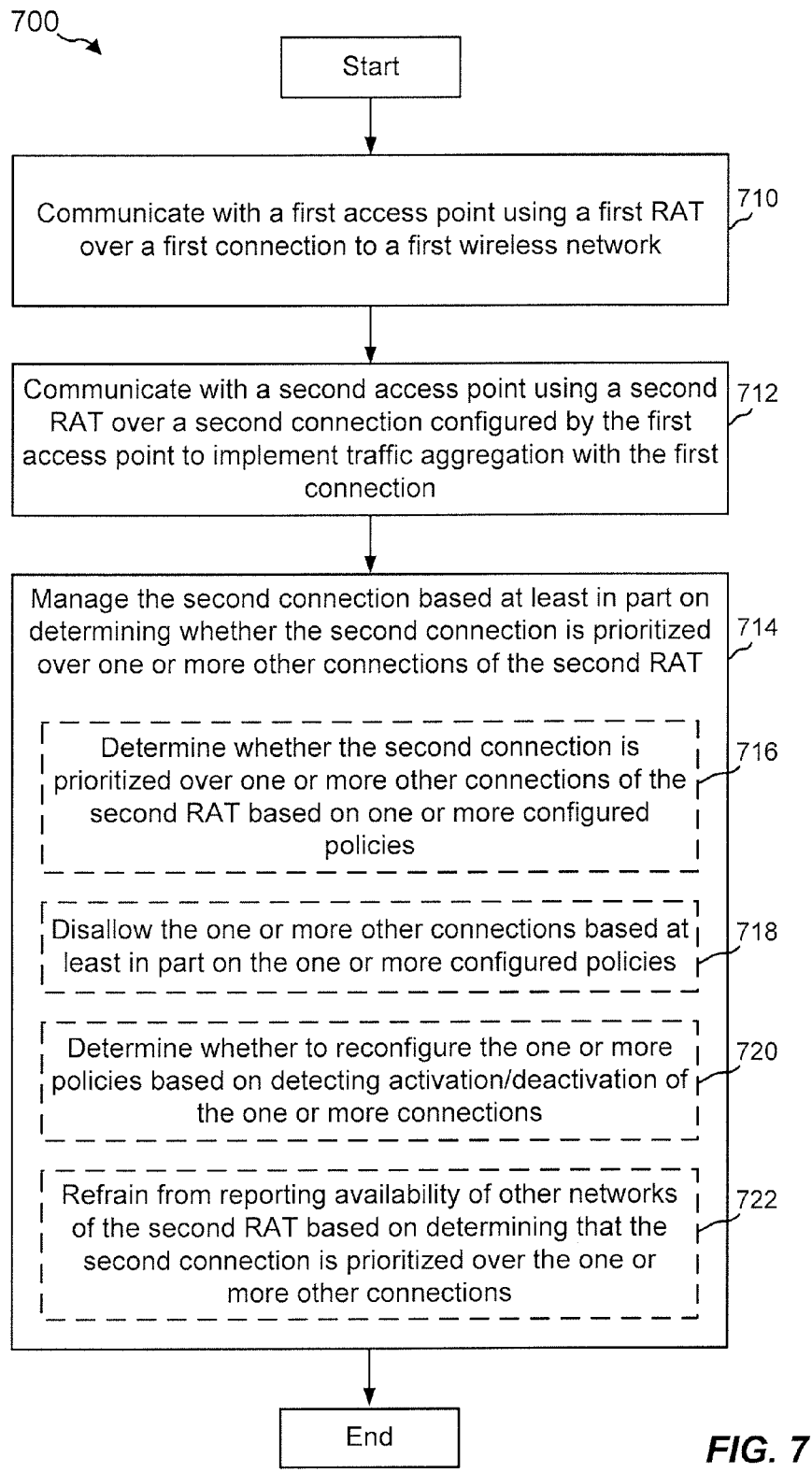
FIG. 7 is a flowchart illustrating a method for managing multiple connections based on a priority of connections in accordance with an aspect of the present disclosure.

FIG. 7 illustrates an example method 700 for managing a connection with a second RAT that provides traffic aggregation for a connection with a first RAT based on a determined priority for connections of the second RAT. Method 700 includes, at Block 710, communicating with a first access point using a first RAT over a first connection to a first wireless network. UE 515 includes a communicating component 540 for communicating with the first access point (e.g., eNodeB 505) using the first RAT (e.g., LTE, UMTS, etc.) over the first connection (e.g., communication link 525) to first network. Method 700 also includes, at Block 712, communicating with a second access point using a second RAT over a second connection configured by the first access point to implement traffic aggregation with the first connection. Thus, communicating component 540 can also communicate with the second access point (e.g., WLAN AP 506) using the second RAT (e.g., 802.11 WiFi) over the second connection (e.g., communication link 526) configured by the first access point (e.g., eNodeB 505) to implement traffic aggregation with the first connection (e.g., communication link 525), as described.

Method 700 also includes, at Block 714, managing the second connection based at least in part on determining whether the second connection is prioritized over one or more other connections of the second RAT. Connection managing component 560 can manage the second connection based at least in part on determining whether the second connection is prioritized over one or more other connections of the second RAT. It is to be appreciated that a priority among connections of the second RAT can be determined from a configuration stored in or otherwise obtained by the UE 515.

In one example, communicating component 540 includes an ANDSF receiving component 550 for obtaining an ANDSF configuration and/or one or more related policies for communicating with one or more WLAN APs. The ANDSF configuration can be configured in the UE 515, configured based on provisioning from the eNodeB 505 (e.g., in an ANDSF management object (MO) received from an ANDSF entity in the wireless network), configured by operation of an interface on the UE 515, and/or the like. In addition, in this example, the ANDSF configuration and/or policies can be provisioned or otherwise modified by eNodeB 505. The ANDSF can include one or more policies for network selection at the UE 515 with one or more active network connections, discovery information to identify and connect to networks that may be within a vicinity of the UE 515, etc. Communicating component 540 can also include an ANDSF configuring component 555 for initializing the ANDSF configuration or policies on the UE 515 for discovering and selecting networks that utilize the second RAT.

Thus, in one example of managing the second connection with WLAN AP 506, ANDSF receiving component 550 can receive one or more ANDSF configurations or related policies that indicate a priority between traffic aggregation and ANDSF rules (e.g., for all ANDSF rules or specifically per ANDSF rule in the ANDSF configuration). In an example, as part of managing the second connection at Block 714, method 700 can include, at Block 716, determining whether the second connection is prioritized over one or more other connections of the second RAT based on one or more configured policies. Thus, connection managing component 560 can determine whether the second connection is prioritized over one or more other connections of the second RAT based on the one or more configured policies in the one or more ANDSF configurations. For example, ANDSF receiving component 550 can receive the configurations or related policies from eNodeB 505, WLAN AP 506, and/or other network components. In this regard, once ANDSF configuring component 555 configures UE 515 according to the received ANDSF configuration, connection managing component 560 may determine and/or assign priority for the traffic aggregation connection with WLAN AP 506 or another connection with WLAN AP 506 or another WLAN AP based at least in part on the priority indicated in the ANDSF configuration.

In managing the second connection at Block 714, method 700 can also include, at Block 718, disallowing the one or more other connections based at least in part on the one or more configured policies. Connection managing component 560 can disallow the one or more other connections based at least in part on the one or more configured policies. Thus, in the example described above, where communicating component 540 is communicating with WLAN AP 506 using traffic aggregation for the connection with eNodeB 505 and communicating component 540 detects another WLAN AP (or a WLAN network provided by the WLAN AP 506), connection managing component 560 can determine whether to maintain the traffic aggregation connection and disallow the WLAN connection, or whether to terminate the traffic aggregation connection in favor of allowing WLAN connection to the WLAN network based on the ANDSF configuration. It is to be appreciated that connection managing component 560 can make this determination when one WLAN connection is supported (otherwise, as discussed further herein, connection managing component 560 may allow a traffic aggregation connection and one or more WLAN connections). For example, this may be a function of the UE 515 having one usable or enabled WLAN interface.

For example, in this regard, ANDSF may be augmented to include an indication of whether, when traffic aggregation is in use, traffic aggregation should take precedence or not. Where the indication indicates that traffic aggregation should take precedence, for example, connection managing component 560 can apply other solutions described herein in managing the second connection. In absence of such setting, connections for traffic aggregation may be assumed to have priority. In one example, an indication RAN_Aggregation_Priority may be included in the ANDSF MO received by the ANDSF receiving component 550. This setting can be provided by the home public land mobile network (HPLMN) or the visited public land mobile network (VPLMN) in the respective ANDSF MOs.

In one option, the RAN_Aggregation_Priority applies to all the ANDSF MO rules received by the ANDSF receiving component 550. In such case, when the second connection is a traffic aggregation connection (e.g., RAN aggregation is active), if the RAN_Aggregation_Priority is set to indicate preference for traffic aggregation, connection managing component 560 does not consider any ANDSF rules as valid or active in managing other connections, e.g., in determining whether to initiate connections to other WLAN networks. If the VPLMN ANDSF MO is being used, this may result in the UE to use the rules of the HPLMN ANDSF MO.

In another option, a different RAN_Aggregation_Priority may be provided for each ANDSF MO rule received by ANDSF receiving component 550. Thus, in an example, activation or deactivation of a certain connections may apply to different rules having different behaviors. Thus, for example, managing the second connection at Block 714 may include, at Block 720, determining whether to reconfigure the one or more policies based on detecting activation/ deactivation of the one or more connections. In this example, an ANDSF reconfiguring component 570 optionally included in UE 515 may reevaluate the ANDSF rules for validity due to an optional traffic aggregation detecting component 565 in the UE 515 detecting the activation or deactivation of traffic aggregation implemented by the second connection, and may thus determine whether to reconfigure the one or more policies based on detecting the activation/deactivation of the one or more connections. In such case, when traffic aggregation is active, if the RAN_Aggregation_Priority in an ANDSF rule received by ANDSF receiving component 550 is determined by connection managing component 560 to be set to indicate preference for traffic aggregation, the connection managing component 560 does not consider the ANDSF rule as valid in managing other connections to WLAN APs, and thus gives priority to the traffic aggregation connection with WLAN AP 506.

In yet another option, a different RAN_Aggregation_Priority may be provided for each ANDSF MO rules received by ANDSF receiving component 550, and it can be assumed that ANDSF rules are not reevaluated for validity by a ANDSF reconfiguring component 570 due to the activation or deactivation of traffic aggregation. In such case, when traffic aggregation is active over the second connection, if the connection managing component 560 determines that the RAN_Aggregation_Priority in a valid ANDSF rule is set to indicate preference for traffic aggregation, the connection managing component 560 may not consider the ANDSF rule as active in managing other connections to other WLAN APs.

In addition, where managing the second connection includes determining other networks to report for possible connectivity using the second RAT, method 700 may include, at Block 722, refraining from reporting availability of other networks of the second RAT based on determining that the second connection is prioritized over the one or more other connections. Network reporting component 575 may refrain from reporting availability of other networks of the second RAT based on determining that the second connection (e.g., traffic aggregation connection) is prioritized over one or more other connections. Thus, as described further below, an HLOS may not receive the one or more other connections as possible connections to which the UE 515 can initiate access over the second RAT based on the priority while the second connection is activated.

Figure 8:
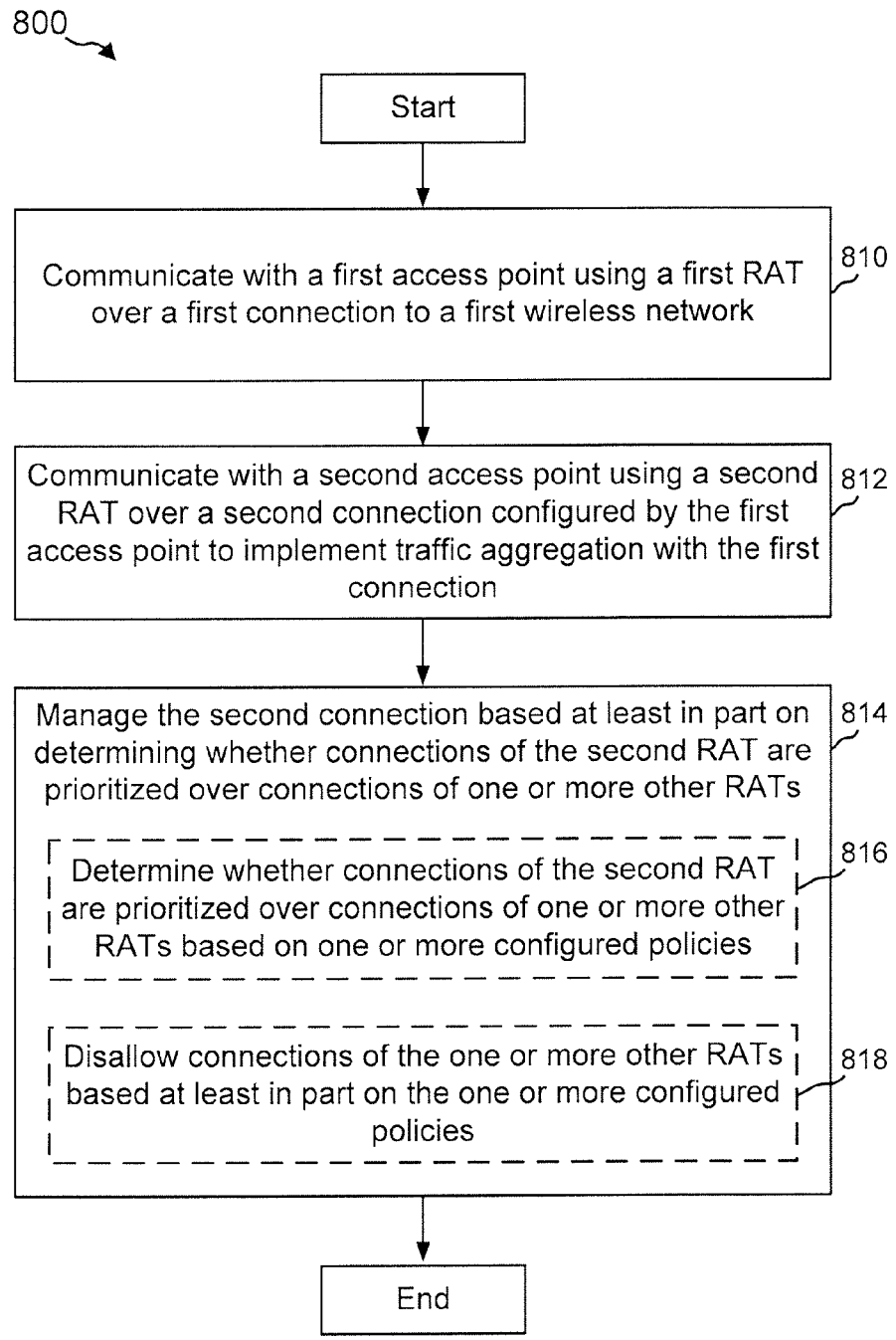
FIG. 8 is a flowchart illustrating a method for managing multiple connections based on a priority of connections in accordance with an aspect of the present disclosure.

FIG. 8 illustrates an example method 800 for managing a connection with a second RAT that provides traffic aggregation for a connection with a first RAT based on a determined priority for connections of the second RAT or of other RATs. Method 800 includes, at Block 810, communicating with a first access point using a first RAT over a first connection to a first wireless network. UE 515 includes a communicating component 540 for communicating with the first access point (e.g., eNodeB 505) using the first RAT (e.g., LTE, UMTS, etc.) over the first connection (e.g., communication link 525) to first network. Method 800 also includes, at Block 812, communicating with a second access point using a second RAT over a second connection configured by the first access point to implement traffic aggregation with the first connection. Thus, communicating component 540 can also communicate with the second access point (e.g., WLAN AP 506) using the second RAT (e.g., 802.11 WiFi) over the second connection (e.g., communication link 526) configured by the first access point (e.g., eNodeB 505) to implement traffic aggregation with the first connection (e.g., communication link 525), as described.

Method 800 also includes, at Block 814, managing the second connection based at least in part on determining whether connections of the second RAT are prioritized over connections of one or more other RATs. Connection managing component 560 can manage the second connection based at least in part on determining whether the connections of the second RAT are prioritized over connections of one or more other RATs. It is to be appreciated that a priority among connections of multiple RATs can be determined from a configuration stored in or otherwise obtained by the UE 515.

In one example, an ANDSF configuration may indicate traffic aggregation as a RAT type that can be used in ANDSF rules. In this example, ANDSF rules may include indications of preferences between different RATs, e.g. 3GPP vs. WLAN, LTE vs. WLAN, and combinations of them (e.g. LTE preferable to WLAN but WLAN preferable to universal mobile telecommunications system (UMTS) terrestrial RAN (UTRAN)). In addition, an identifier for traffic aggregation can be supported in the list of preferable RATs. Thus, ANDSF receiving component 550 may receive an ANDSF configuration that specifies traffic aggregation as one of many different RATs in one or more rules. For example, the ANDSF configuration may specify a preference for traffic aggregation over evolved UTRAN (E-UTRAN), E-UTRAN over WLAN, etc. Thus, managing the second connection at Block 814 may include, at Block 816, determining whether connections of the second RAT are prioritized over connections of one or more other RATs based on one or more configured policies. In this regard, connection managing component 560 can manage the second connection by determining whether connections of the second RAT are prioritized over connections of one or more other RATs. In addition, managing the second connection at Block 814 may include, at Block 818, disallowing connections of the one or more other RATs based at least in part on the one or more configured policies. Connection managing component 560 can disallow connections of the one or more other RATs based at least in part on the one or more configured policies. Accordingly, for example, connection managing component 560 can manage the second connection such to maintain traffic aggregation (e.g., the second RAT) and disallow other connections over other RAT types (e.g., non-traffic aggregation types), or disable traffic aggregation upon encountering a network of a different RAT type based on one or more of the rules that specify a preference for traffic aggregation over other RAT types.

When ANDSF receiving component 550 receives, and ANDSF configuring component 555 configures, ANDSF rules indicating traffic aggregation has priority over WLAN connections, and the UE 515 supports only one WLAN connection (e.g., by virtue of having a single WLAN radio or a single WLAN interface available), ANDSF policies may not apply when the UE 515 is using the WLAN interface for traffic aggregation over communication link 526, as described. In this regard, managing the second connection, at Block 614, may include refraining from reporting the availability of an interface of the second RAT and/or one or more detected networks of the second RAT to upper layers, as described above in Block 722 of method 700. To ensure this functionality, for example, UE 515 can include the network reporting component 575 for refraining from reporting the availability of the WLAN interface to the upper layers of the UE 515 (e.g., HLOS, application, interface or similar layers). Therefore, ANDSF rules, which may operate at these layers, may not be able to detect any WLAN interface available and do not attempt to discover or select any WLAN interface or to steer traffic on WLAN. In another example, in this scenario, network reporting component 575 can refrain from reporting any WLAN networks available to the ANDSF function. It is to be appreciated that network reporting component 575 can report existence of the WLAN interface and/or one or more networks to the HLOS, application, interface, etc. to allow for selecting one or more of the networks for communications. Thus, network reporting component 575 refraining from reporting availability of the interface and/or any networks can ensure WLAN networks are not selected at least while traffic aggregation is active.

Therefore, upon receiving an indication from the eNodeB 505 at the communicating component 540 that traffic aggregation is being activated, managing the second connection, at Block 614, can include network reporting component 575 refraining from reporting to the upper layers the availability of any network of the second RAT (e.g., WLAN) or may refrain from reporting the availability of the second RAT interface at all. In addition, in this regard, communicating component 540 may receive an indication from eNodeB 505 that traffic aggregation is stopped, and in this example, network reporting component 575 can continue reporting availability of the WLAN interface and/or which WLAN networks are available to the HLOS, applications, interfaces, etc. according to the ANDSF configuration received by ANDSF receiving component 550 (at least until another indication is received from an eNodeB that traffic aggregation is activated). It is to be appreciated, in these examples, that WLAN AP 506 can be configured to provide traffic aggregation connections as well as connections to a WLAN network. In one example, each type of connection can include a respective service set identifier (SSID) or other advertised or unadvertised configuration parameters for the connections, which communicating component 540 utilizes to establish the communication link 526.

Figure 9:
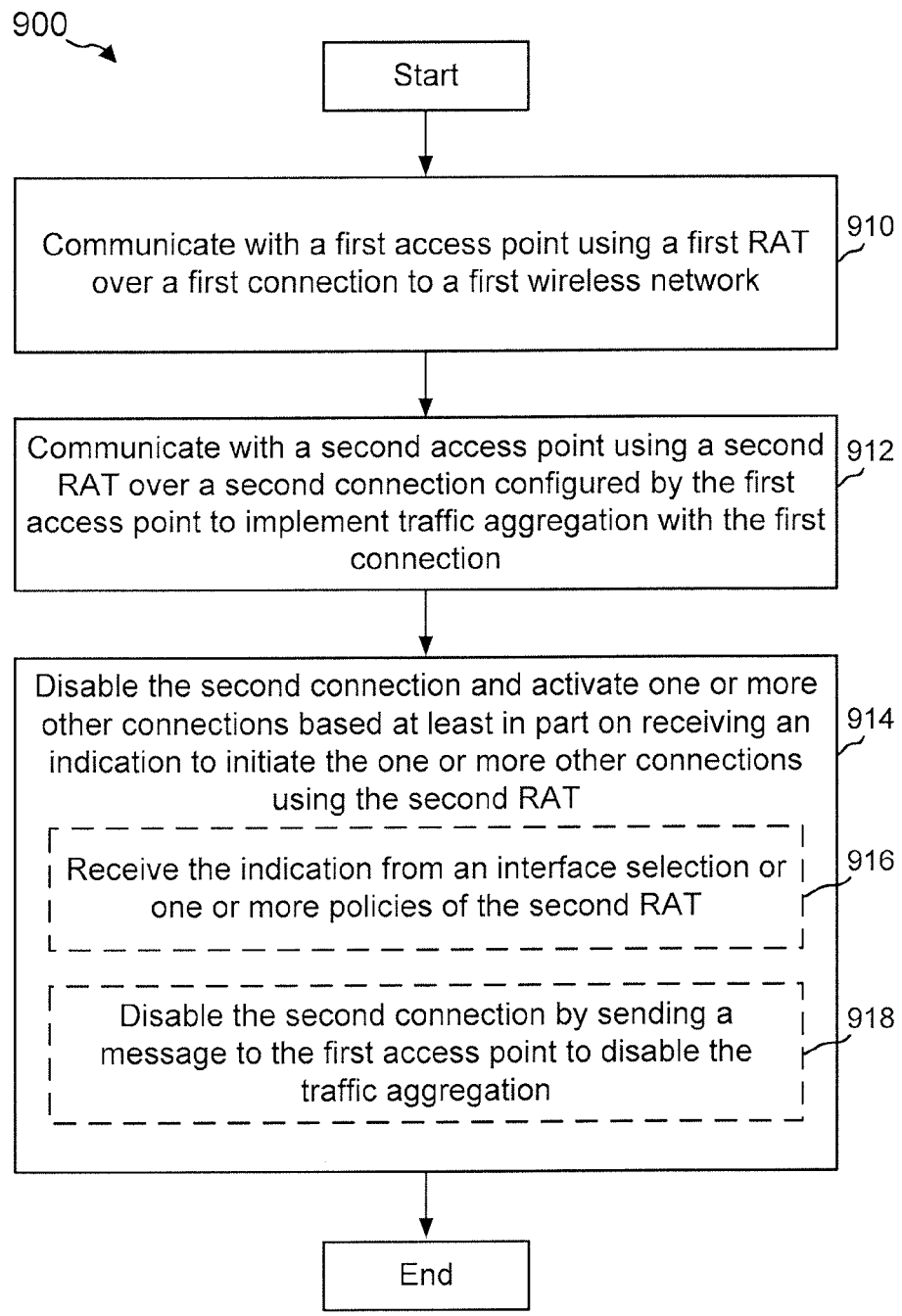
FIG. 9 is a flowchart illustrating a method for disabling a connection in accordance with an aspect of the present disclosure.

FIG. 9 illustrates an example method 900 for disabling a connection that uses a RAT based on receiving an indication to initiate one or more other connections using the RAT. Method 900 includes, at Block 910, communicating with a first access point using a first RAT over a first connection to a first wireless network. UE 515 includes a communicating component 540 for communicating with the first access point (e.g., eNodeB 505) using the first RAT (e.g., LTE, UMTS, etc.) over the first connection (e.g., communication link 525) to first network. Method 900 also includes, at Block 912, communicating with a second access point using a second RAT over a second connection configured by the first access point to implement traffic aggregation with the first connection. Thus, communicating component 540 can also communicate with the second access point (e.g., WLAN AP 506) using the second RAT (e.g., 802.11 WiFi) over the second connection (e.g., communication link 526) configured by the first access point (e.g., eNodeB 505) to implement traffic aggregation with the first connection (e.g., communication link 525), as described.

Method 900 also includes, at Block 914, disabling the second connection and activating one or more other connections based at least in part on receiving an indication to initiate the one or more other connections using the second RAT. Connection managing component 560 can manage the second connection to disable the second connection and activate one or more other connections using the second RAT. For example, connection managing component 560 can determine to allow overriding of the traffic aggregation connection by selection of a WLAN network from the HLOS, application, interface, etc. of UE 515. For example, network selecting component 580 may allow for selection of one or more networks by an HLOS, application, interface, etc. of UE 515, where an indication of the networks can be provided by network reporting component 575 detecting the networks based at least in part on ANDSF policies or rules. Selection of a network via network selecting component 580 can include receiving the indication to initiate one or more connections with the network (e.g., via the second RAT), and connection managing component 560 may accordingly override traffic aggregation with the network or another network of the second RAT (e.g., a WLAN network) such that the traffic aggregation connection is disabled in favor of activating the one or more connections. In this example, the ANDSF rules may not indicate a priority or a traffic aggregation RAT type.

For example, disabling the second connection at Block 914 can include, at Block 916, receiving the indication from an interface selection or one or more policies of the second RAT. Connection managing component 560 can receive the indication from the interface selection or one or more policies of the second RAT. In one example, the indication to initiate the one or more connections with the network can be received from an interface selection on the UE 515 displaying a list of available second RAT networks. Once the selection is received, for example, connection managing component 560 can disable the traffic aggregation connection by sending a message to eNodeB 505 indicating to cancel or indicating lower priority for the traffic aggregation. In addition, disabling the second connection at Block 914 may include, at Block 918, disabling the second connection by sending a message to the first access point to disable the traffic aggregation. Connection managing component 560 may disable the disable the second connection by sending the message to the first access point (e.g., eNodeB 505) to disable the traffic aggregation. In an example, connection managing component 560 can specify a cause code indicating that the traffic aggregation is being canceled due to the indication to initiate the one or more other connections. Thus, connection managing component 560 can be configured to additionally send another indication to the first access point when the one or more connections are terminated to indicate that another traffic aggregation connection can be established.

In this regard, where the UE 515 supports one WLAN connection, when the upper layers in the UE 515 select a WLAN for connectivity via network selecting component 580, connection managing component 560 can manage the second connection (e.g., at Block 614) by ceasing traffic aggregation if traffic aggregation is active (e.g., by terminating communication link 526). In this example, the connection managing component 560 may resume traffic aggregation at the communicating component 540 when the upper layers release the selected WLAN connection (e.g., via network selecting component 580) or when the WLAN connection selected by the upper layers is no longer available, which may be detected by network selecting component 580.

In a specific example, where the UE 515 is connected to WLAN1 for traffic aggregation and traffic aggregation is active over communication link 526, upon receiving an indication from higher layers that a WLAN2 different from WLAN1 is selected, connection managing component 560 can stop traffic aggregation (alternatively, the traffic aggregation may stop when the user or HLOS tries to initiate the use of the WLAN interface to search for available WLANs via network reporting component 575). In addition, in this example, connection managing component 560 may send a message to the eNodeB 505 to stop traffic aggregation with WLAN1 over communication link 526. Additionally, for example, connection managing component 560 can optionally provide a reason cause in the message to stop traffic aggregation to indicate that traffic aggregation is being stopped due to overriding of WLAN network selection. Thus, in this example, upon receiving the indication from the UE 515 to stop traffic aggregation and including an indication that traffic aggregation is being stopped due to overriding of WLAN selection, the eNodeB 505 can refrain from attempting to activate traffic aggregation at the UE 515 until it receives an indication from the UE 515 that the UE 515 is capable of resuming traffic aggregation (e.g., where connection with WLAN2 is terminated). It is to be appreciated, for example, that WLAN1 can be an interface at WLAN AP 506 that provides traffic aggregation, and WLAN2 can be at least one of another interface at WLAN AP 506 that provides access to a WLAN network, or another WLAN AP altogether (e.g., optional WLAN AP 508).

Figure 10:
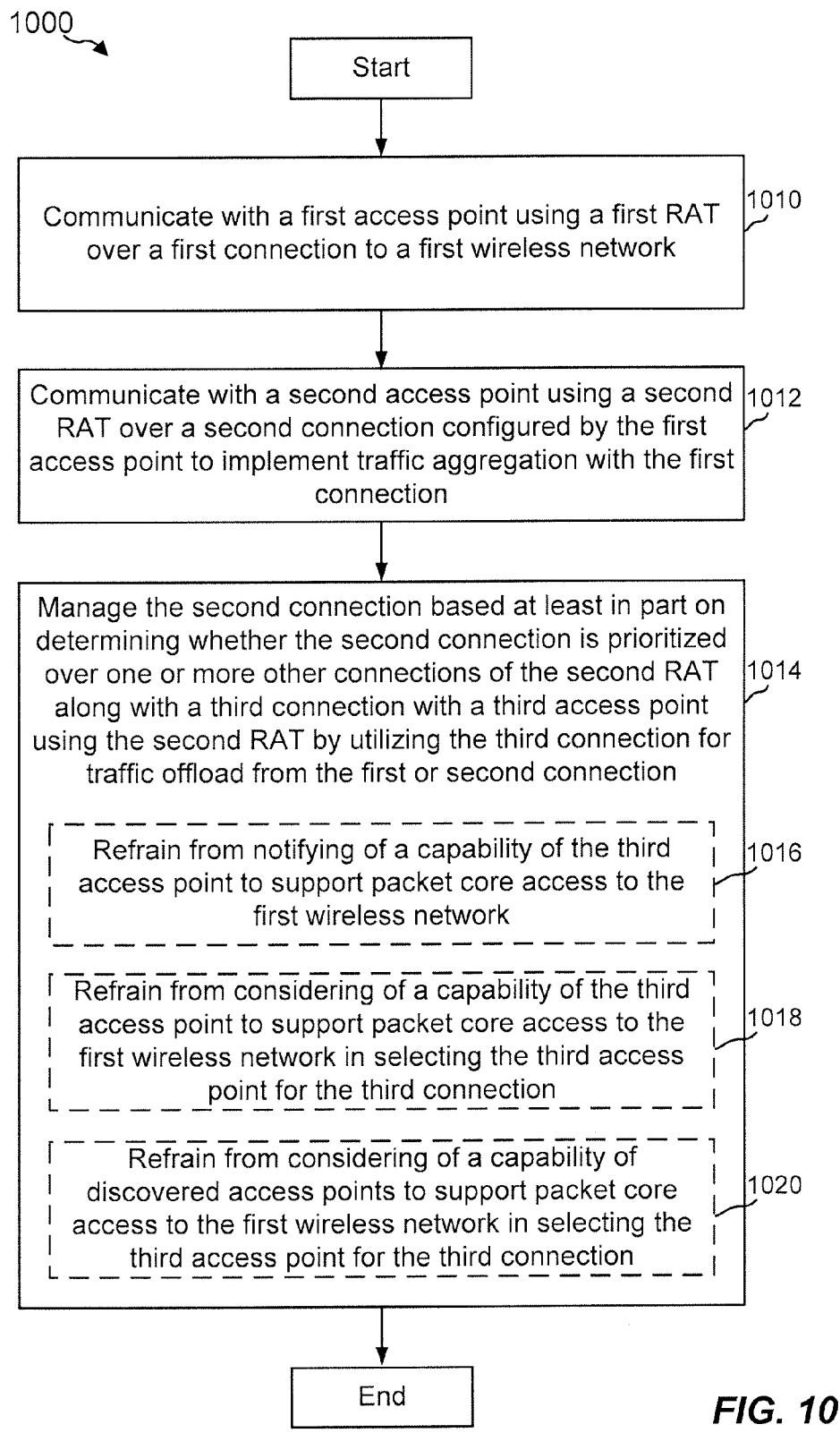
FIG. 10 is a flowchart illustrating a method for managing multiple connections based on a priority of connections in accordance with an aspect of the present disclosure.

FIG. 10 illustrates an example method 1000 for disabling a connection that uses a RAT based on receiving an indication to initiate one or more other connections using the RAT. Method 1000 includes, at Block 1010, communicating with a first access point using a first RAT over a first connection to a first wireless network. UE 515 includes a communicating component 540 for communicating with the first access point (e.g., eNodeB 505) using the first RAT (e.g., LTE, UMTS, etc.) over the first connection (e.g., communication link 525) to first network. Method 1000 also includes, at Block 1012, communicating with a second access point using a second RAT over a second connection configured by the first access point to implement traffic aggregation with the first connection. Thus, communicating component 540 can also communicate with the second access point (e.g., WLAN AP 506) using the second RAT (e.g., 802.11 WiFi) over the second connection (e.g., communication link 526) configured by the first access point (e.g., eNodeB 505) to implement traffic aggregation with the first connection (e.g., communication link 525), as described.

Method 1000 also includes, at Block 1014, managing the second connection based at least in part on determining whether the second connection is prioritized over one or more other connections of the second RAT along with a third connection with a third access point using the second RAT by utilizing the third connection for traffic offload from the first or second connection. Connection managing component 560 can manage the second connection based at least in part on determining whether the second connection is prioritized over one or more other connections of the second RAT along with the third connection for traffic overload from the first or second connection. Thus, UE 515 may be capable of connecting to two networks of the second RAT (e.g., two WLAN networks) using different radios. In this regard, for example, connection managing component 560 may maintain the traffic aggregation connection with WLAN AP 506 using communication link 526, and the connection to eNodeB 505 over communication link 525, while also allowing another WLAN connection to an optional WLAN AP 508 using communication link 528 (e.g., for NSWO, EPC connectivity, etc., as described). In this example, managing the second connection, at Block 1014, can include determining how to configure the other connection, steer traffic over the second connection (e.g., communication link 526) and the other connection (e.g., communication link 528) of the second RAT, etc. In one specific example, connection managing component 560 can configure the additional connection for offloading traffic and not packet core access, where the traffic aggregation link is active and provides packet core access. Then, connection managing component 560 can accordingly steer traffic over the second connection and additional connections.

Thus, managing the second connection and the third connection at Block 1014 can include, at Block 1016, refraining from notifying of a capability of the third access point to support packet core access to the first wireless network. Connection managing component 560 can refrain from notifying of a capability of the third access point to support packet core access to the first network. Thus, as the third access point is used for offloading traffic over the second RAT, it may not support packet core access in addition. Refraining from notifying may include refraining from notifying a higher layer application, such as a HLOS, of the capability of the third access point to support the packet core access. Moreover, in this regard, managing the second connection and the third connection at Block 1014 may include, at Block 1018, refraining from considering a capability of the third access point to support packet core access to the first wireless network in selecting the third access point for the third connection. Connection managing component 560 can refrain from considering the capability of the third access point to support packet core access to the first wireless network in selecting the third access point for the third connection. Additionally, in this regard, managing the second connection and the third connection at Block 1014 may include, at Block 1020, refraining from considering a capability of discovered access points to support packet core access to the first wireless network in selecting the third access point for the third connection. Connection managing component 560 can refrain from considering the capability of any discovered access points to support packet core access to the first wireless network in selecting the third access point for the third connection.

In a specific example, when the UE 515 is capable of connecting to multiple WLAN networks, then connection managing component 560 may select and connect to a WLAN2, which can relate to a WLAN network accessible from WLAN AP 506, or a WLAN3, which can relate to a WLAN network accessible from optional WLAN AP 508. In such scenario, connection managing component 560 may connect in NSWO to WLAN2, and then use ANDSF to steer traffic selection to WLAN2 or WLAN3, for example.

In one example, the ANDSF MO received by ANDSF receiving component 550 is configured to prefer a network that provides EPC connectivity (e.g., S2a connectivity), and WLAN2 or WLAN3 allow EPC connectivity. In this example, if connection managing component 560 is using WLAN1 for traffic aggregation, which can relate to traffic aggregation over communication link 526 to WLAN AP 506, and upper layers (e.g. HLOS, applications interfaces, ANDSF, etc.) trigger connectivity to WLAN2 or WLAN3 when the UE 515 can connect to multiple WLAN networks, then connection managing component 560 may connect to WLAN2 or WLAN3 for NSWO even if the ANDSF MO received by ANDSF receiving component 550 is configured to prefer networks that support EPC connectivity and WLAN2 and WLAN3 support EPC connectivity. In this example, connection managing component 560 refrains from considering whether EPC connectivity support is provided. This can occur since the UE 515 is connected to WLAN1 with EPC connectivity by virtue of the traffic aggregation. For example, where connection managing component 560 is using traffic aggregation with WLAN1 and is configured by ANDSF to prefer WLAN networks that support EPC connectivity, upon network reporting component 575 discovering WLAN networks that support EPC connectivity, connection managing component 560 may not indicate to upper layers that such networks support EPC connectivity.

Alternatively, where connection managing component 560 is using traffic aggregation with WLAN1 and received ANDSF rules indicate to prefer WLAN networks that support EPC connectivity, connection managing component 560 may not consider the indication for preference of WLAN networks that support EPC when performing WLAN network selection of which available WLAN networks support EPC connectivity in managing the other connections in relation to the second connection. Alternatively, where connection managing component 560 is using traffic aggregation with WLAN1 and configured to prefer WLAN networks that support EPC connectivity, when performing WLAN network selection, connection managing component 560 may not consider EPC connectivity as one of the factors for WLAN network selection. This allows the connection managing component 560 to leverage the traffic aggregation connection to WLAN AP 506 as the EPC connectivity WLAN connection, and thus allows for connecting to other WLAN networks for other purposes (e.g., NSWO).

It is to be appreciated that the above examples may also apply such that priority of traffic aggregation over other connections of the second RAT can be supported per bearer. If the UE supports one WLAN connection, and traffic aggregation is active over communication link 526 (even if it applies to a single bearer of a single PDN connection), the UE 515 can behave as in the solutions described above. If the UE supports more than one WLAN connection, however, and traffic aggregation is active for a specific set of bearers, ANDSF rules received by ANDSF receiving component 550 may not apply to PDN connections corresponding to the bearers for which traffic aggregation is active. In this example, steering of traffic of other PDN connections (e.g., connections over WLAN2 or WLAN3 using NSWO or EPC connectivity) can be based on ANDSF policies. Thus, connection managing component 560 can utilize the second connection for some bearers but may not use another connection (e.g., of the second RAT) for other bearers.

Figure 11:
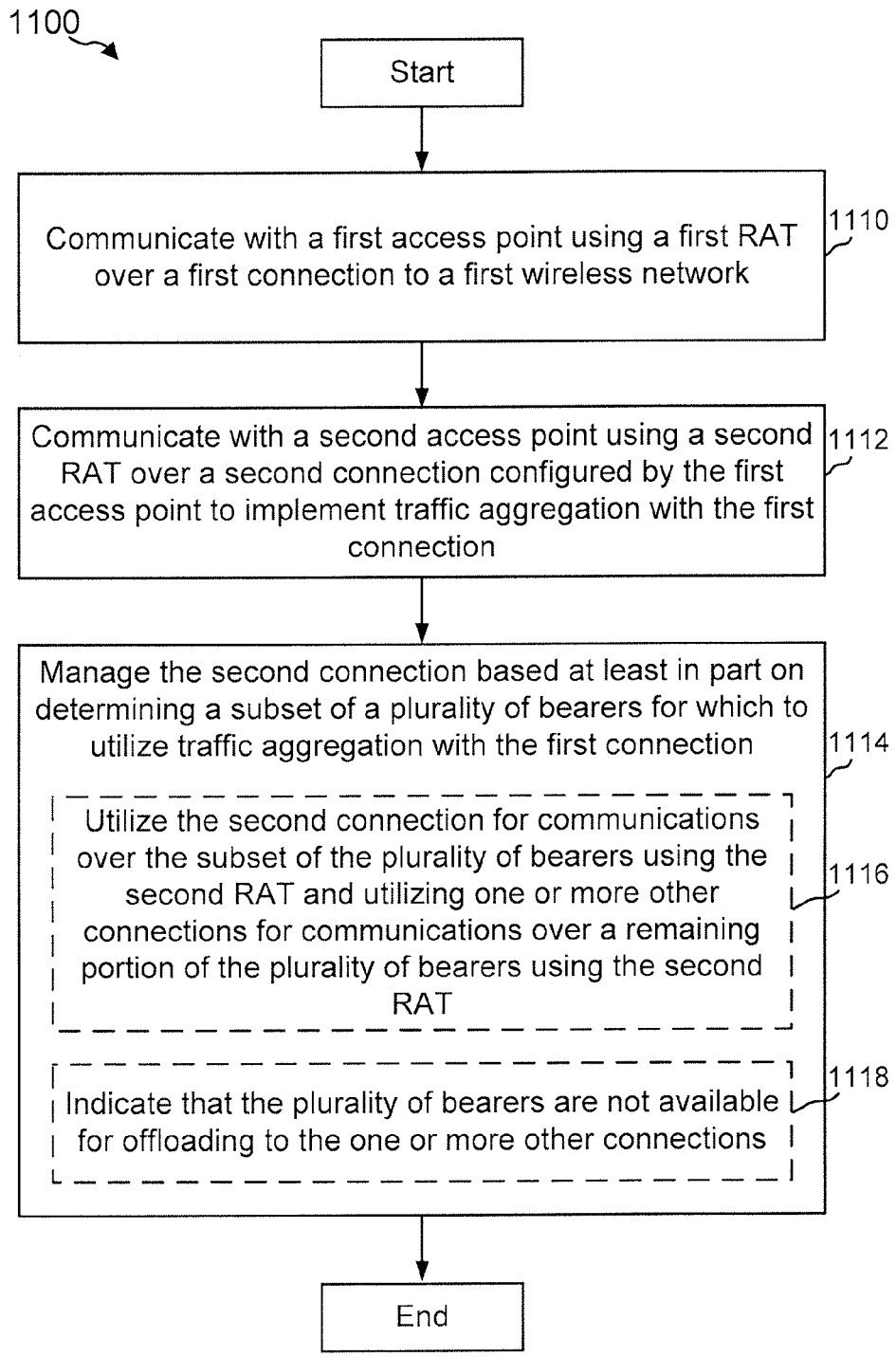
FIG. 11 is a flowchart illustrating a method for managing multiple bearers in traffic aggregation in accordance with an aspect of the present disclosure.

FIG. 11 illustrates an example method 1100 for managing a connection based on determining a subset of bearers for which to utilize traffic aggregation. Method 1100 includes, at Block 1110, communicating with a first access point using a first RAT over a first connection to a first wireless network. UE 515 includes a communicating component 540 for communicating with the first access point (e.g., eNodeB 505) using the first RAT (e.g., LTE, UMTS, etc.) over the first connection (e.g., communication link 525) to first network. Method 1100 also includes, at Block 1112, communicating with a second access point using a second RAT over a second connection configured by the first access point to implement traffic aggregation with the first connection. Thus, communicating component 540 can also communicate with the second access point (e.g., WLAN AP 506) using the second RAT (e.g., 802.11 WiFi) over the second connection (e.g., communication link 526) configured by the first access point (e.g., eNodeB 505) to implement traffic aggregation with the first connection (e.g., communication link 525), as described.

Method 1100 also includes, at Block 1114, managing the second connection based at least in part on determining a subset of a plurality of bearers for which to utilize traffic aggregation with the first connection. Connection managing component 560 can manage the second connection based at least in part on determining the subset of the plurality of bearers for which to utilize traffic aggregation with the first connection. In one example, this can include, at Block 1116, utilizing the second connection for communications over the subset of the plurality of bearers using the second RAT and utilizing one or more other connections for communications over a remaining portion of the plurality of bearers using the second RAT. In addition, managing the second connection at Block 1114 may additionally include, at Block 1118, indicating that the plurality of bearers are not available for offloading to the one or more other connections. For example, when traffic aggregation is activated for a set of bearers, connection managing component 560, in managing the second connection, can identify which PDN connections the set of bearers belong to and can indicate to the upper layers (e.g., layers that implement ANDSF) that such PDN connections are not available for offloading to WLAN. Upon receiving such indications from the lower layers, if ANDSF rules indicate that one of those PDN connections is to be offloaded to WLAN, the upper layers will not offload the PDN connection to WLAN until the lower layers indicate that the PDN is available for offloading (e.g., until connection managing component 560 deactivates the traffic aggregation for the bearers corresponding to that PDN connection).

Figure 12:
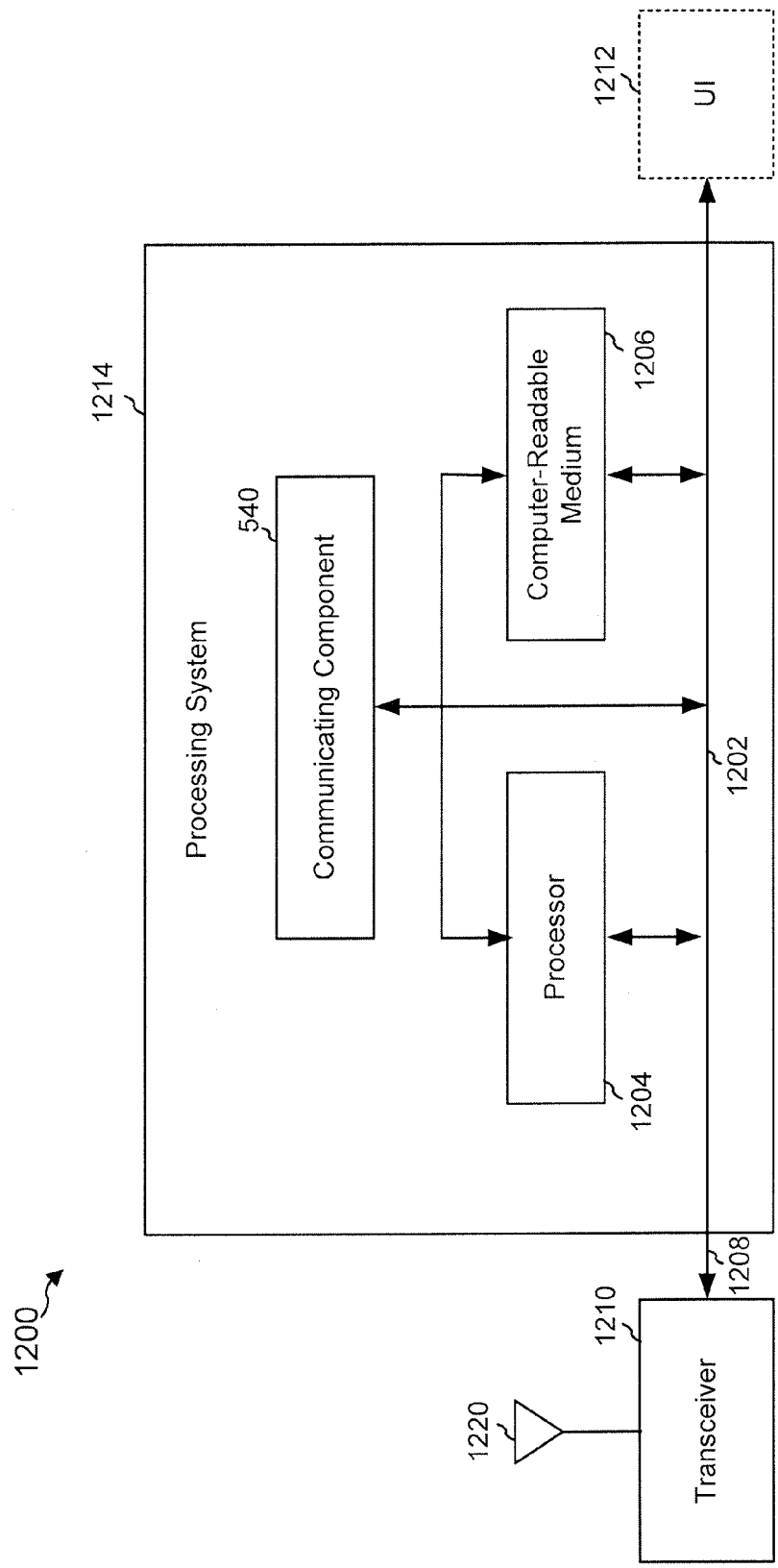
FIG. 12 is a block diagram conceptually illustrating an example hardware implementation for an apparatus employing a processing system configured in accordance with an aspect of the present disclosure.

FIG. 12 is a block diagram conceptually illustrating an example hardware implementation for an apparatus 1200 employing a processing system 1214 configured in accordance with an aspect of the present disclosure. The processing system 1214 includes a communicating component 540 for performing aspects described herein, including managing first and second connections with one or more base stations where at least one of the first and second connections implements traffic aggregation. In one example, the apparatus 1200 may be the same or similar, or may be included with one of the UEs described in various Figures. In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits including one or more processors (e.g., central processing units (CPUs), microcontrollers, application specific integrated circuits (ASICs), field programmable gate arrays (FPGAs) represented generally by the processor 1204, and computer-readable media, represented generally by the computer-readable medium 1206. The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210, which is connected to one or more antennas 1220 for receiving or transmitting signals. The transceiver 1210 and the one or more antennas 1220 provide a mechanism for communicating with various other apparatus over a transmission medium (e.g., over-the-air). Depending upon the nature of the apparatus, a user interface (UI) 1212 (e.g., keypad, display, speaker, microphone, joystick) may also be provided.

The processor 1204 is responsible for managing the bus 1202 and general processing, including the execution of software stored on the computer-readable medium 1206. The software, when executed by the processor 1204, causes the processing system 1214 to perform the various functions described herein for any particular apparatus, such as communicating component 540, and/or to perform functions described for communicating component 540 and/or in methods 600, 700, 800, 900, 1000, and/or 1100. The computer-readable medium 1206 may also be used for storing data that is manipulated by the processor 1204 when executing software to perform functions described for communicating component 540 and/or in methods 600, 700, 800, 900, 1000, and/or 1100. The communicating component 1240 as described above may be implemented in whole or in part by processor 1204, or by computer-readable medium 1206, or by any combination of processor 1204 and computer-readable medium 1206.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but it is to be accorded the widest scope consistent with the principles and novel features disclosed herein.

What is claimed is:

1. A method for communicating with one or more wireless networks using multiple radio access technologies (RATs), comprising:

communicating, by a user equipment (UE), with a first access point using a first RAT over a first connection to access a first wireless network;

communicating, by the UE, with a second access point using a second RAT over a second connection, wherein the second connection is configured to implement traffic aggregation with the first connection based at least in part on a configuration received from the first access point;

receiving, by the UE, one or more policies for communicating using the second RAT, wherein the one or more policies specify whether to prioritize connections configured to implement traffic aggregation over other connections;

determining, by the UE, whether to prioritize the second connection configured to implement the traffic aggregation over one or more other connections, wherein the determining is based at least in part on the one or more policies; and determining to refrain from reporting availability of other networks of the second RAT to a selection function of the second RAT based at least in part on determining to prioritize, based at least in part on the one or more policies, connections of the second RAT configured to use traffic aggregation over other connections of the second RAT.

2. The method of claim 1, wherein the one or more other connections correspond to connections of the second RAT.

3. The method of claim 1, wherein receiving the one or more policies comprises receiving the one or more policies from the first access point or the second access point.

4. The method of claim 1, wherein the one or more policies specify to prioritize connections of the second RAT configured to implement the traffic aggregation over other connections of the second RAT, and further comprising disallowing the one or more other connections where the one or more other connections relate to the second RAT regardless of other policies related to the second RAT.

5. The method of claim 1, wherein the one or more policies specify to prioritize connections of the second RAT configured to implement the traffic aggregation over a subset of rules related to other connections of the second RAT, and further comprising at least one of:
  disallowing the one or more other connections to which the subset of rules apply where the one or more other connections relate to the second RAT; or
  allowing the one or more other connections to which the subset of rules do not apply where the one or more other connections relate to the second RAT, and disabling the second connection in favor of the one or more other connections.

6. The method of claim 5, further comprising determining whether to reconfigure the one or more policies based at least in part on detecting activation or deactivation of one or more connections that utilize traffic aggregation.

7. The method of claim 1, further comprising determining to refrain from reporting availability of the other networks of the second RAT to a second RAT interface based at least in part on determining to prioritize, based at least in part on the one or more policies, connections of the second RAT configured to use traffic aggregation over other connections of the second RAT.

8. The method of claim 1, wherein the one or more other connections correspond to connections of other RATs.

9. The method of claim 1, wherein the one or more policies specify at least one of whether to prioritize all connections configured to implement traffic aggregation or specific connections configured to implement traffic aggregation over other connections.

10. The method of claim 8, wherein determining whether to manage the second connection comprises disallowing the one or more other connections, wherein the one or more other connections are related to other RATs, and wherein the one or more policies specify to prioritize connections of the second RAT configured to use traffic aggregation over connections that utilize other RATs.

11. The method of claim 1, further comprising receiving an indication to initiate the one or more other connections using the second RAT, and disabling the second connection and activating the one or more other connections based at least in part on determining, based on the one or more policies, to prioritize the one or more other connections over the second connection.

12. The method of claim 11, wherein receiving the indication comprises receiving the indication from an interface selection or one or more policies of the second RAT.

13. The method of claim 11, wherein disabling the second connection comprises sending a message to the first access point to disable the traffic aggregation.

14. The method of claim 13, wherein sending the message to the first access point to disable traffic aggregation comprises sending a cause code in the message related to disabling traffic aggregation due to receiving the indication to initiate the one or more other connections.

15. The method of claim 14, further comprising:
  sending another indication to the first access point related to termination of the one or more other connections based at least in part on terminating the one or more other connections; and
  initiating another connection using the second RAT to access the first wireless network based at least in part on sending the another indication to the first access point.

16. The method of claim 1, further comprising utilizing a third connection with a third access point for specified traffic offload from the first connection or the second connection as specified by one or more offload policies and not for packet core access to the first wireless network.

17. The method of claim 16, wherein utilizing the third connection for specified traffic offload comprises refraining from notifying of a capability of the third access point to support packet core access to the first wireless network.

18. The method of claim 16, wherein utilizing the third connection for specified traffic offload comprises refraining from considering a capability of the third access point to support packet core access to the first wireless network in selecting the third access point for the third connection.

19. The method of claim 16, wherein utilizing the third connection for specified traffic offload comprises refraining from considering a capability of discovered access points to support packet core access to the first wireless network in selecting the third access point for the third connection.

20. The method of claim 1, wherein determining whether to prioritize the second connection comprises determining a subset of a plurality of bearers for which to utilize traffic aggregation, and further comprising:
  utilizing the second connection for communications over the subset of the plurality of bearers using the second RAT; and
  utilizing the one or more other connections for communications over a remaining portion of the plurality of bearers using the second RAT.

21. The method of claim 20, wherein utilizing the one or more other connections for communications over the remaining portion of the plurality of bearers is based at least in part on the one or more policies.

22. The method of claim 20, wherein utilizing the second connection for communications over the subset of the plurality of bearers using the second RAT comprises indicating that the plurality of bearers are not available for offloading to the one or more other connections.

23. The method of claim 22, wherein indicating that the plurality of bearers are not available for offloading is in one or more offload policies specified for the second RAT.

24. An apparatus for communicating with one or more wireless networks using multiple radio access technologies (RATs), comprising:
  at least one processor configured to:
    communicate with a first access point using a first RAT over a first connection to access a first wireless network, and communicate with a second access point using a second RAT over a second connection, wherein the second connection is configured to implement traffic aggregation with the first connection based at least in part on a configuration received from the first access point;

receive one or more policies for communicating using the second RAT, wherein the one or more policies specify whether to prioritize connections configured to implement traffic aggregation over other connections;

determine whether to prioritize the second connection configured to implement the traffic aggregation over one or more other connections, wherein the determining is based at least in part on the one or more policies; and determine to refrain from reporting availability of other networks of the second RAT to a selection function of the second RAT based at least in part on determining to prioritize, based at least in part on the one or more policies, connections of the second RAT configured to use traffic aggregation over other connections of the second RAT; and a memory coupled to the at least one processor.

25. The apparatus of claim 24, wherein the one or more other connections correspond to connections of the second RAT.

26. An apparatus for communicating with one or more wireless networks using multiple radio access technologies (RATs), comprising:

means for communicating with a first access point using a first RAT over a first connection to access a first wireless network;

means for communicating with a second access point using a second RAT over a second connection, wherein the second connection is configured to implement traffic aggregation with the first connection based at least in part on a configuration received from the first access point;

means for receiving one or more policies for communicating using the second RAT, wherein the one or more policies specify whether to prioritize connections configured to implement traffic aggregation over other connections;

means for determining, by the apparatus, whether to prioritize the second connection configured to implement the traffic aggregation over one or more other connections, wherein the determining is based at least in part on the one or more policies; and means for determining to refrain from reporting availability of other networks of the second RAT to a selection function of the second RAT based at least in part on determining to prioritize, based at least in part on the one or more policies, connections of the second RAT configured to use traffic aggregation over other connections of the second RAT.

27. The apparatus of claim 26, wherein the one or more other connections correspond to connections of the second RAT.

28. A non-transitory computer-readable storage medium for communicating with one or more wireless networks using multiple radio access technologies (RATs), comprising:

code for causing at least one computer to communicate, by a user equipment (UE), with a first access point using a first RAT over a first connection to access a first wireless network;

code for causing the at least one computer to communicate, by the UE, with a second access point using a second RAT over a second connection, wherein the second connection is configured to implement traffic aggregation with the first connection based at least in part on a configuration received from the first access point;

code for causing the at least one computer to receive, by the UE, one or more policies for communicating using the second RAT, wherein the one or more policies specify whether to prioritize connections configured to implement traffic aggregation over other connections;

code for causing the at least one computer to determine, by the UE, whether to prioritize the second connection configured to implement the traffic aggregation over one or more other connections, wherein the determining is based at least in part on the one or more policies; and code for causing the at least one computer to determine to refrain from reporting availability of other networks of the second RAT to a selection function of the second RAT based at least in part on determining to prioritize, based at least in part on the one or more policies, connections of the second RAT configured to use traffic aggregation over other connections of the second RAT.

29. The non-transitory computer-readable storage medium of claim 28, wherein the one or more other connections correspond to connections of the second RAT.

* * * * *